US012664504B2

(12) United States Patent
Sawant et al.

(10) Patent No.: US 12,664,504 B2
(45) Date of Patent: Jun. 23, 2026

(54) SYSTEMS AND METHODS TO PROTECT SHARED PRIVILEGED REMOTE ACCESS (PRA) SESSIONS BASED ON USER RISK

(71) Applicant: Zscaler, Inc., San Jose, CA (US)

(72) Inventors: Digambar Sawant, Bangalore (IN); Vivek Bhatt, Bangalore (IN); Dejan Mihajlovic, Sunnyvale, CA (US); Mithun A S, Bangalore (IN); Simhadri Raju Avula, Hyderabad (IN)

(73) Assignee: Zscaler, Inc., San Jose, CA (US)

( * ) Notice: Subject to any disclaimer, the term of this patent is extended or adjusted under 35 U.S.C. 154(b) by 73 days.

(21) Appl. No.: 18/731,725

(22) Filed: Jun. 3, 2024

(65) Prior Publication Data

US 2025/0078002 A1    Mar. 6, 2025

Related U.S. Application Data

(63) Continuation-in-part of application No. 18/489,779, filed on Oct. 18, 2023.

(30) Foreign Application Priority Data

Sep. 4, 2023    (IN) .............................. 202311059336
Apr. 15, 2024    (IN) .............................. 202441030253

(51) Int. Cl.
  *G06Q 10/0635* (2023.01)
  *G06Q 10/0639* (2023.01)
(52) U.S. Cl.
  CPC ... *G06Q 10/0635* (2013.01); *G06Q 10/06393* (2013.01)

(58) Field of Classification Search
None
See application file for complete search history.

(56) References Cited

U.S. PATENT DOCUMENTS

| | | | | |
|---|---|---|---|---|
| 9,824,335 | B1 * | 11/2017 | Vander Mey ...... | G06Q 10/1093 |
| 11,811,855 | B1 | 11/2023 | Mihajlovic et al. | |
| 2015/0180829 | A1 * | 6/2015 | Yu ......................... | H04L 63/083 726/11 |
| 2016/0232465 | A1 * | 8/2016 | Kurtz ................. | G06Q 10/0635 |
| 2018/0027006 | A1 * | 1/2018 | Zimmermann ..... | H04L 63/0227 726/11 |

(Continued)

FOREIGN PATENT DOCUMENTS

| | | | | |
|---|---|---|---|---|
| CA | 2968248 C | * | 9/2023 | ......... H04L 63/0815 |

OTHER PUBLICATIONS

"Zscaler Privileged Remote Access for OT and IIoT Systems" (2024)(https://www.zscaler.com/resources/data-sheets/privileged-remote-access-for-ot-and-iiot.pdf) (Year: 2024).*

*Primary Examiner* — Sujay Koneru
(74) *Attorney, Agent, or Firm* — Baratta Law PLLC; Lawrence A. Baratta, Jr.; Ryan Odessa

(57) ABSTRACT

Systems and methods to protect shared Privileged Remote Access (PRA) sessions based on user risk include receiving, at a Privileged Remote Access (PRA) system, one or more invitations from a host, the one or more invitations being for one or more users to join a PRA session; responsive to receiving the one or more invitations, determining a risk score of each of the one or more users associated with the one or more invitations; and rejecting or allowing each of the one or more invitations based on the risk score of each of the one or more users.

14 Claims, 36 Drawing Sheets

┌3700

┌3702
RESPONSIVE TO DETERMINING ONE OR MORE USERS ARE ALLOWED TO ACCESS AN APPLICATION ASSOCIATED WITH INFRASTRUCTURE, DETERMINING THE ONE OR MORE USERS' SECURITY AND ACCESS POLICIES, AND CREATING A PRIVILEGED REMOTE ACCESS (PRA) SESSION FOR THE ONE OR MORE USERS

┌3704
BROKERING A CONNECTION BETWEEN ONE OR MORE USER DEVICES ASSOCIATED WITH THE ONE OR MORE USERS AND THE APPLICATION THROUGH A LIGHTWEIGHT CONNECTOR, AND ENABLING THE ONE OR MORE USERS TO SEND COMMANDS TO THE APPLICATION

┌3706
RECEIVING A PAUSE COMMAND FROM ONE OF THE ONE OR MORE USERS

┌3708
RESPONSIVE TO RECEIVING THE PAUSE COMMAND, BLOCKING COMMANDS FROM THE ONE OR MORE USERS FROM REACHING THE APPLICATION

(56)  References Cited

U.S. PATENT DOCUMENTS

| | | | | |
|---|---|---|---|---|
| 2018/0069866 A1* | 3/2018 | Chalmers | ................ | H04L 63/20 |
| 2020/0089892 A1* | 3/2020 | Ojha | ....................... | H04L 67/55 |
| 2021/0136041 A1* | 5/2021 | Foxhoven | ............ | H04L 63/029 |
| 2022/0311777 A1* | 9/2022 | Makenzi | ............. | H04L 63/0263 |
| 2022/0353244 A1* | 11/2022 | Kahn | ..................... | H04L 67/12 |

* cited by examiner

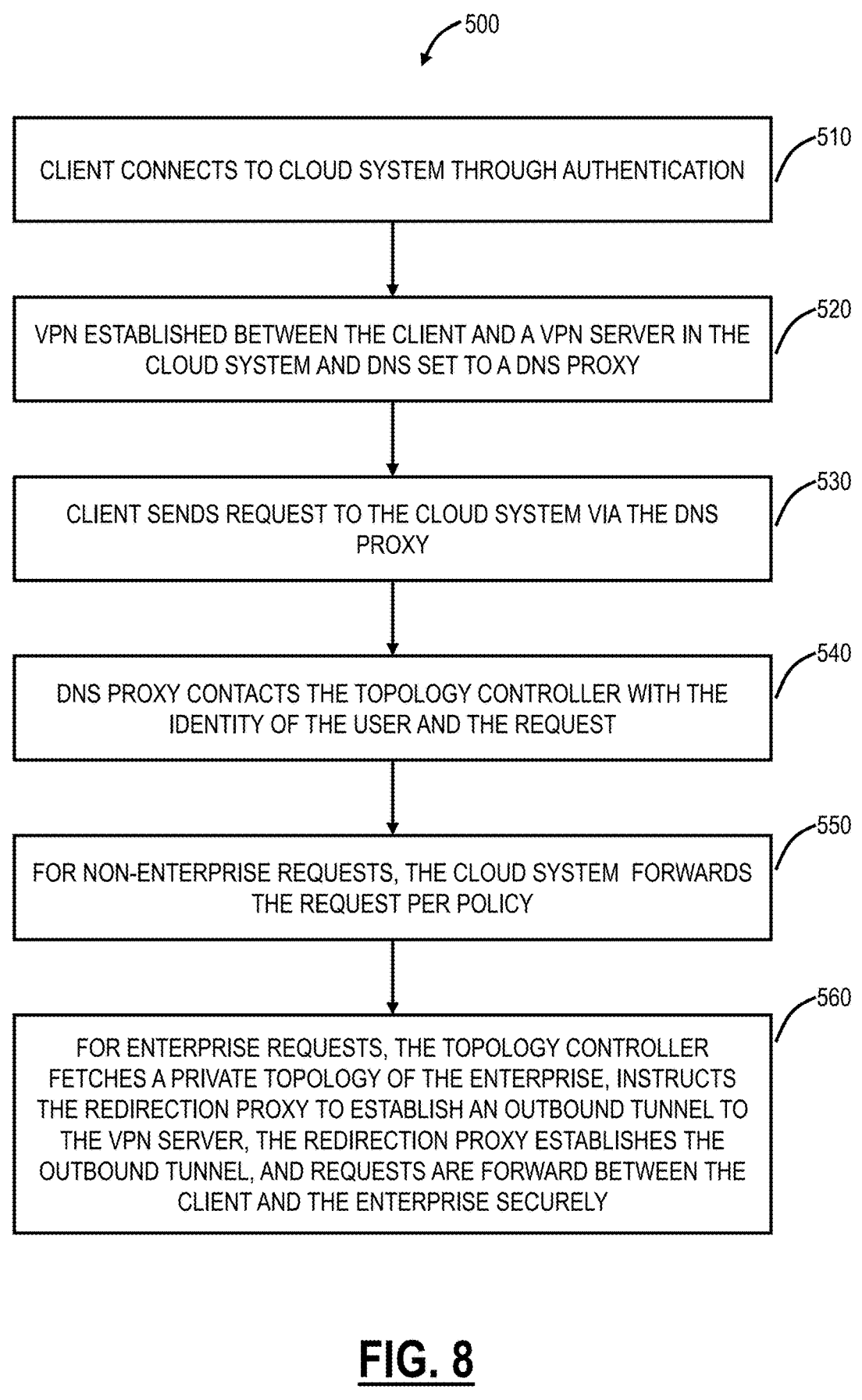

```
┌──────────────────────────────────────────────────────────┐
│                                                            │  510
│  CLIENT CONNECTS TO CLOUD SYSTEM THROUGH AUTHENTICATION    │
│                                                            │
└──────────────────────────────────────────────────────────┘
                             │
                             ▼
┌──────────────────────────────────────────────────────────┐
│                                                            │  520
│  VPN ESTABLISHED BETWEEN THE CLIENT AND A VPN SERVER IN THE│
│       CLOUD SYSTEM AND DNS SET TO A DNS PROXY              │
└──────────────────────────────────────────────────────────┘
                             │
                             ▼
┌──────────────────────────────────────────────────────────┐
│                                                            │  530
│      CLIENT SENDS REQUEST TO THE CLOUD SYSTEM VIA THE DNS  │
│                         PROXY                              │
└──────────────────────────────────────────────────────────┘
                             │
                             ▼
┌──────────────────────────────────────────────────────────┐
│                                                            │  540
│   DNS PROXY CONTACTS THE TOPOLOGY CONTROLLER WITH THE      │
│        IDENTITY OF THE USER AND THE REQUEST                │
└──────────────────────────────────────────────────────────┘
                             │
                             ▼
┌──────────────────────────────────────────────────────────┐
│                                                            │  550
│  FOR NON-ENTERPRISE REQUESTS, THE CLOUD SYSTEM  FORWARDS   │
│               THE REQUEST PER POLICY                       │
└──────────────────────────────────────────────────────────┘
                             │
                             ▼
┌──────────────────────────────────────────────────────────┐
│                                                            │  560
│       FOR ENTERPRISE REQUESTS, THE TOPOLOGY CONTROLLER     │
│   FETCHES A PRIVATE TOPOLOGY OF THE ENTERPRISE, INSTRUCTS  │
│  THE REDIRECTION PROXY TO ESTABLISH AN OUTBOUND TUNNEL TO  │
│  THE VPN SERVER, THE REDIRECTION PROXY ESTABLISHES THE     │
│  OUTBOUND TUNNEL, AND REQUESTS ARE FORWARD BETWEEN THE     │
│          CLIENT AND THE ENTERPRISE SECURELY               │
└──────────────────────────────────────────────────────────┘
```

<u>FIG. 8</u>

INTERNET
104

APPS
404

APPS
402

610

CLOUD-BASED
SYSTEM
100

DATA CENTER

102

REMOTE USERS, CONTRACTORS, PARTNERS

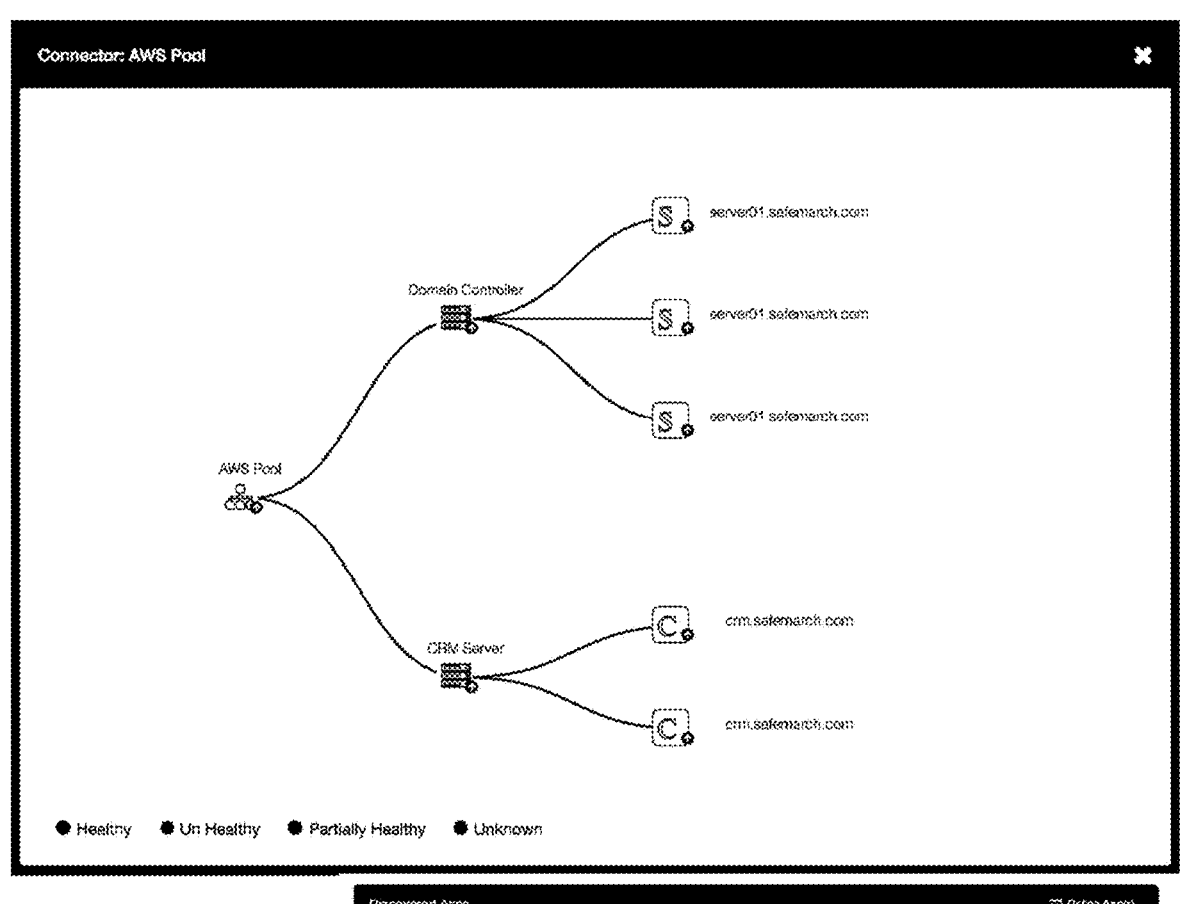
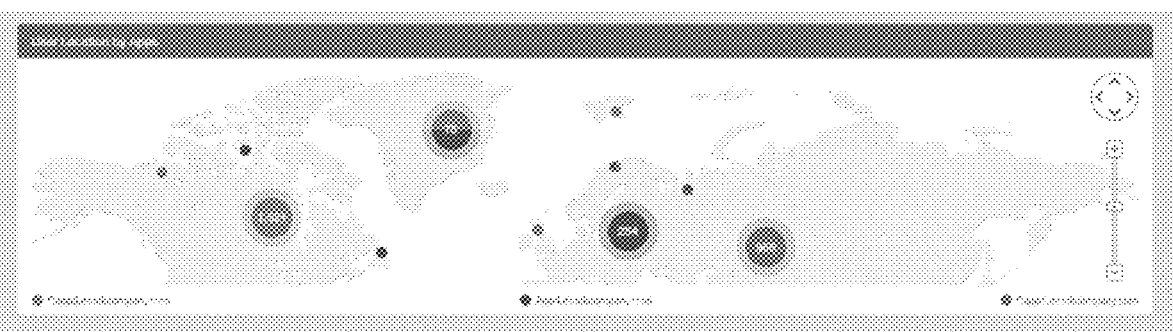
FIG. 19

100

CLOUD-BASED SYSTEM

410

300

150P

404

ENTERPRISE FILE SHARES AND APPS

DMZ

400

400

INTERNET
104

APPS
404

APPS
402

610

CLOUD-BASED
SYSTEM
100

DATA CENTER

102

UNTRUSTED DEVICE    TRUSTED USER    UNTRUSTED USER

3400

RECEIVING A REQUEST TO
ACCESS A PRIVILEGED REMOTE
ACCESS (PRA) SYSTEM
— 3402

DETERMINING IF ANY
CREDENTIAL RULES APPLY TO A
CONSOLE ASSOCIATED WITH THE
REQUEST
— 3404

RETRIEVING CREDENTIALS
ASSOCIATED WITH ANY OF A
USER AND THE CONSOLE
— 3406

PROVIDING ACCESS TO THE
REQUESTED PRA SYSTEM BASED
ON THE RETRIEVED
CREDENTIALS
— 3408

Figure 37:
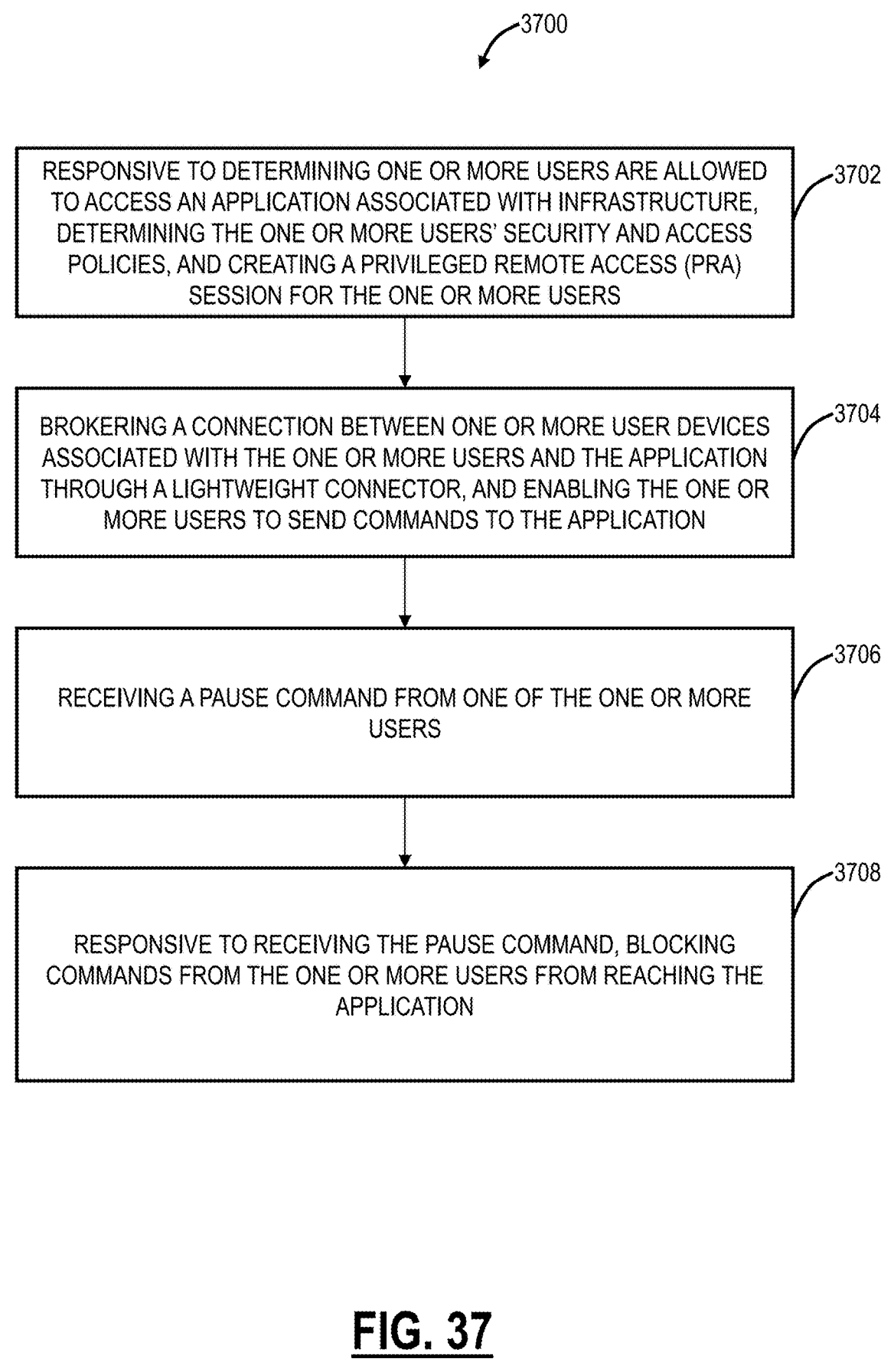

3700

RESPONSIVE TO DETERMINING ONE OR MORE USERS ARE ALLOWED TO ACCESS AN APPLICATION ASSOCIATED WITH INFRASTRUCTURE, DETERMINING THE ONE OR MORE USERS' SECURITY AND ACCESS POLICIES, AND CREATING A PRIVILEGED REMOTE ACCESS (PRA) SESSION FOR THE ONE OR MORE USERS — 3702

BROKERING A CONNECTION BETWEEN ONE OR MORE USER DEVICES ASSOCIATED WITH THE ONE OR MORE USERS AND THE APPLICATION THROUGH A LIGHTWEIGHT CONNECTOR, AND ENABLING THE ONE OR MORE USERS TO SEND COMMANDS TO THE APPLICATION — 3704

RECEIVING A PAUSE COMMAND FROM ONE OF THE ONE OR MORE USERS — 3706

RESPONSIVE TO RECEIVING THE PAUSE COMMAND, BLOCKING COMMANDS FROM THE ONE OR MORE USERS FROM REACHING THE APPLICATION — 3708

Figure 40:
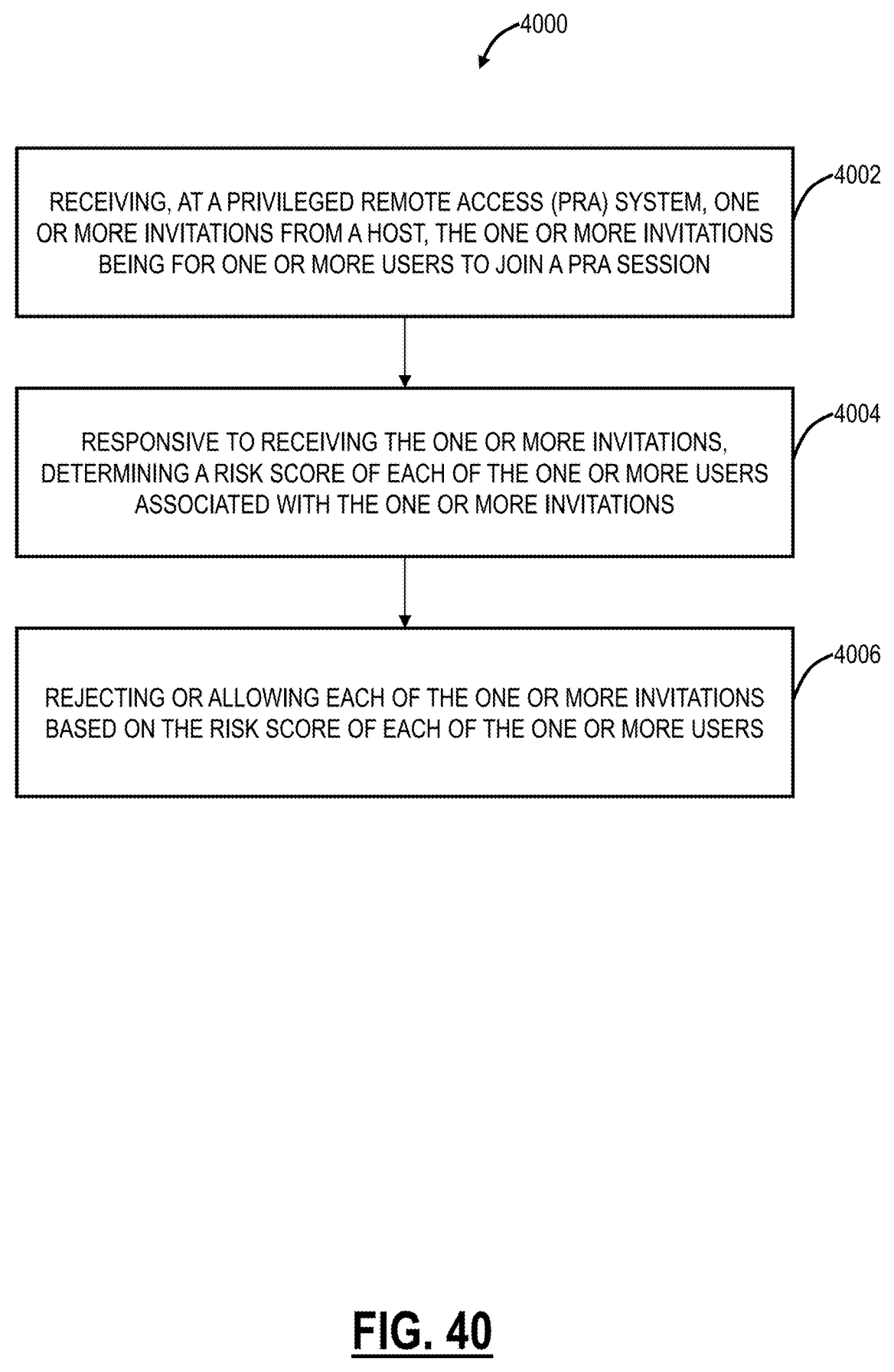

RECEIVING, AT A PRIVILEGED REMOTE ACCESS (PRA) SYSTEM, ONE OR MORE INVITATIONS FROM A HOST, THE ONE OR MORE INVITATIONS BEING FOR ONE OR MORE USERS TO JOIN A PRA SESSION

4002

RESPONSIVE TO RECEIVING THE ONE OR MORE INVITATIONS, DETERMINING A RISK SCORE OF EACH OF THE ONE OR MORE USERS ASSOCIATED WITH THE ONE OR MORE INVITATIONS

4004

REJECTING OR ALLOWING EACH OF THE ONE OR MORE INVITATIONS BASED ON THE RISK SCORE OF EACH OF THE ONE OR MORE USERS

SYSTEMS AND METHODS TO PROTECT SHARED PRIVILEGED REMOTE ACCESS (PRA) SESSIONS BASED ON USER RISK

CROSS-REFERENCE TO RELATED APPLICATION

This patent/application is a continuation-in-part of U.S. patent application Ser. No. 18/489,779, filed Oct. 18, 2023, and entitled "Systems and methods for pause and resume functionality for shared Privileged Remote Access (PRA) sessions," the contents of which are incorporated in full by reference herein.

FIELD OF THE DISCLOSURE

The present disclosure generally relates to computer networking systems and methods. More particularly, the present disclosure relates to systems and methods to protect shared Privileged Remote Access (PRA) sessions based on user risk.

BACKGROUND OF THE DISCLOSURE

The traditional view of an enterprise network (i.e., corporate, private, industrial, operational, etc.) included a well-defined perimeter defended by various appliances (e.g., firewalls, intrusion prevention, advanced threat detection, etc.). In this traditional view, mobile users utilize a Virtual Private Network (VPN), etc. and have their traffic back-hauled into the well-defined perimeter. This worked when mobile users represented a small fraction of the users, i.e., most users were within the well-defined perimeter. However, this is no longer the case—the definition of the workplace is no longer confined to within the well-defined perimeter, and with applications moving to the cloud, the perimeter has extended to the Internet. Because of such advancements, the use of shared Privileged Remote Access (PRA) sessions allows users to simultaneously access and manage critical systems or data remotely, under elevated or privileged user roles. Though useful, such technologies can introduce risk to an enterprise's environment and systems. The present disclosure describes security advancements related to shared PRA sessions.

BRIEF SUMMARY OF THE DISCLOSURE

The present disclosure relates to systems and methods to protect shared Privileged Remote Access (PRA) sessions based on user risk. In various embodiments, steps include receiving, at a Privileged Remote Access (PRA) system, one or more invitations from a host, the one or more invitations being for one or more users to join a PRA session; responsive to receiving the one or more invitations, determining a risk score of each of the one or more users associated with the one or more invitations; and rejecting or allowing each of the one or more invitations based on the risk score of each of the one or more users.

The steps can further include wherein the determining includes referencing a user risk database for determining a risk score of each of the one or more users associated with the one or more invitations. The rejecting or allowing can be based on the risk score of each of the one or more users being below or above a threshold. The steps can include (i) rejecting an invitation of the one or more invitations based on a user associated with the invitation being in a high-risk category based on their risk score, (ii) allowing an invitation of the one or more invitations based on a user associated with the invitation being in a low-risk category based on their risk score, and (iii) allowing an invitation of the one or more invitations with read-only access based on a user associated with the invitation being in a medium-risk category based on their risk score. The steps can further include responsive to allowing one or more invitations, creating a PRA session, and brokering a connection between one or more users associated with the one or more allowed invitations and an application through a lightweight connector, and enabling the one or more users to send commands to the application. The steps can further include enforcing read-only policy on any of the one or more users during the PRA session based on the risk score of each of the one or more users. The steps can further include continuously monitoring risk scores of the one or more users during the PRA session. The steps can further include responsive to detecting an updated risk score for a user of the one or more users, enforcing read-only policy on the user during the PRA session. The steps can further include responsive to detecting an updated risk score for a user of the one or more users, kicking the user from the PRA session. The steps can further include responsive to detecting an updated risk score for a user of the one or more users, notifying the host of the updated risk score.

BRIEF DESCRIPTION OF THE DRAWINGS

The present disclosure is illustrated and described herein with reference to the various drawings, in which like reference numbers are used to denote like system components/method steps, as appropriate, and in which:

FIG. 1C is a logical diagram illustrating zero trust policies with the cloud-based system and a comparison with the conventional firewall-based approach.

FIG. 5 is a block diagram of a user device, which may be used with the cloud-based system or the like.

FIG. 8 is a flowchart of a VPN process for an intelligent, cloud-based global VPN.

Figures 13, 14:
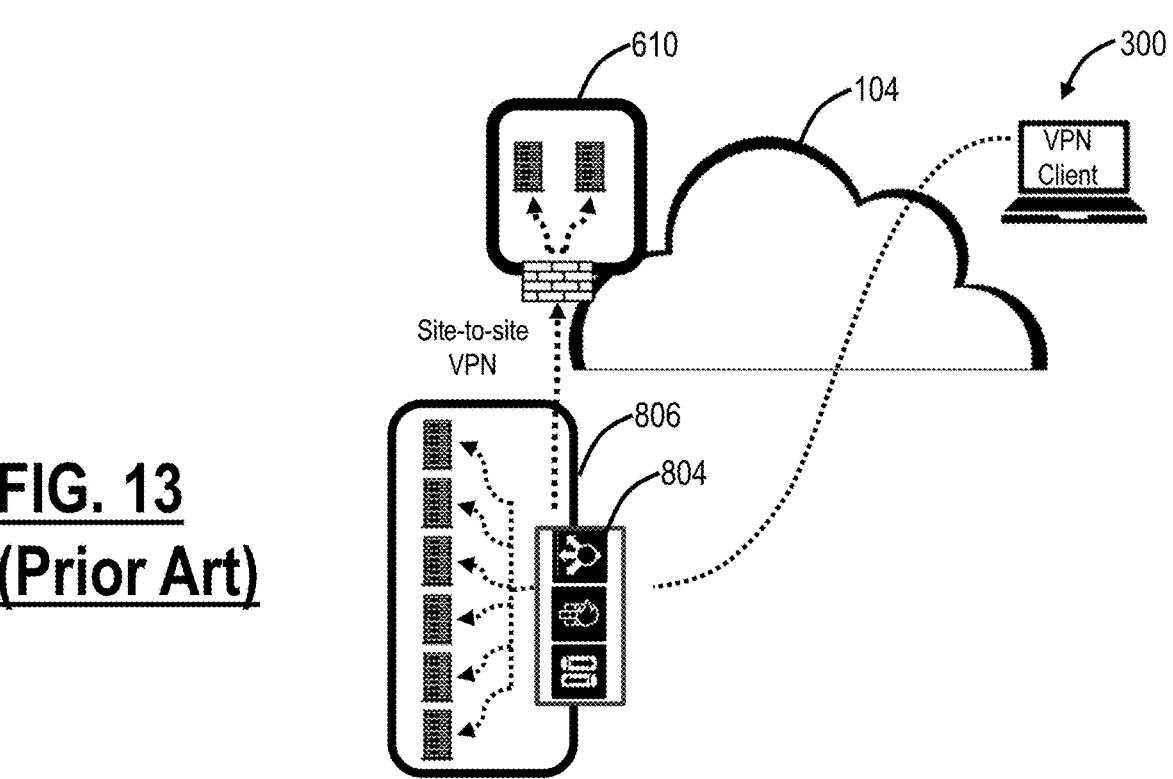
FIGS. 13 and 14 are network diagrams of conventional private application access in the public cloud (FIG. 13)

compared to private applications in the public cloud with virtual private access (FIG. 14).

Figures 15, 16:
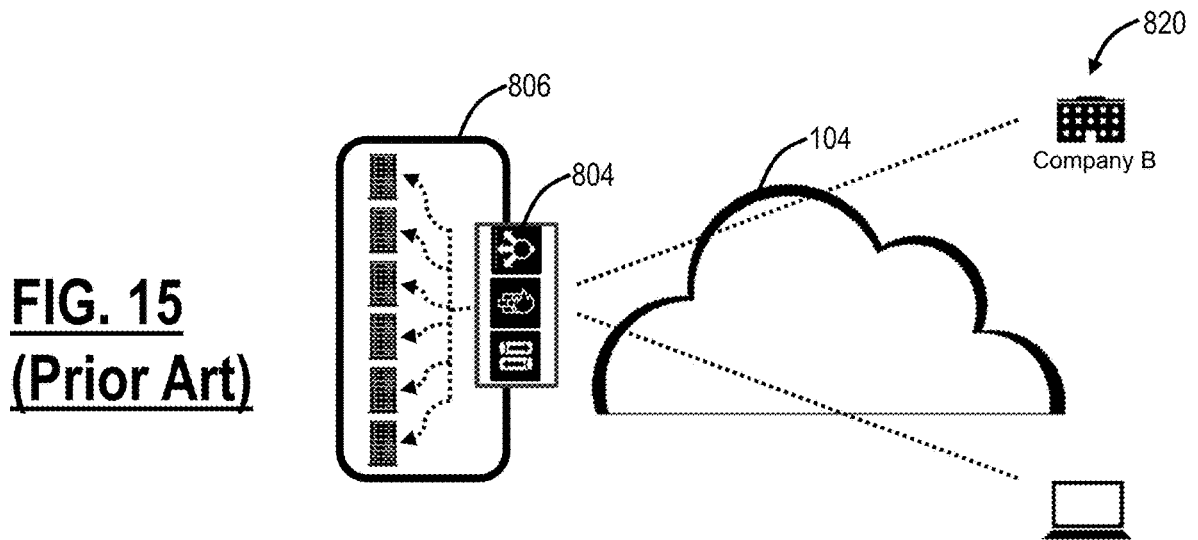

FIGS. 15 and 16 are network diagrams of conventional contractor/partner access (FIG. 15) of applications in the enterprise network compared to contractor/partner access (FIG. 16) of the applications with virtual private access.

Figures 17, 18:
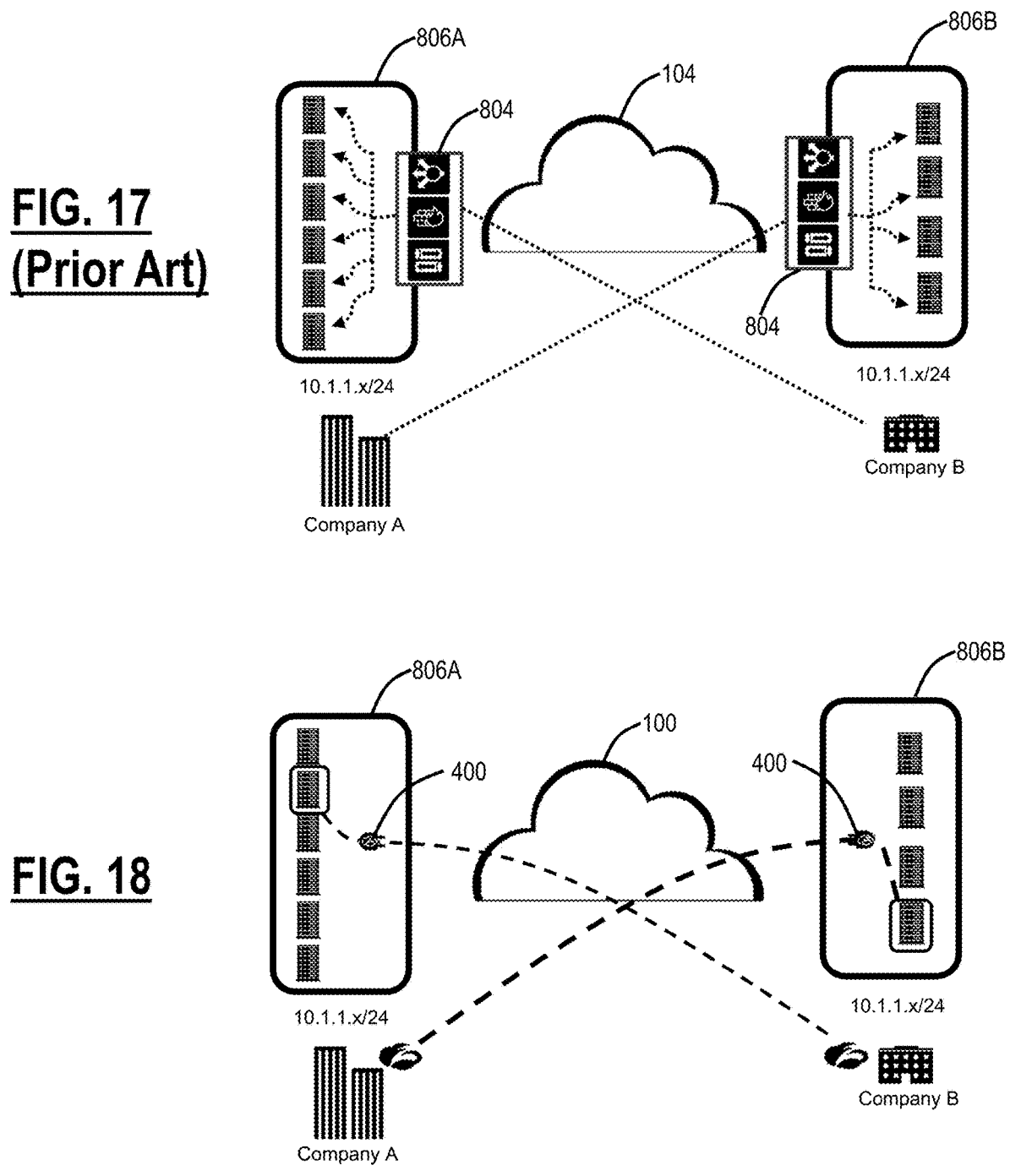

FIGS. 17 and 18 are network diagrams of a conventional network setup to share data between two companies (FIG. 17) such as for Merger and Acquisition (M&A) purposes or the like compared to a network setup using virtual private access (FIG. 18).

Figure 20:
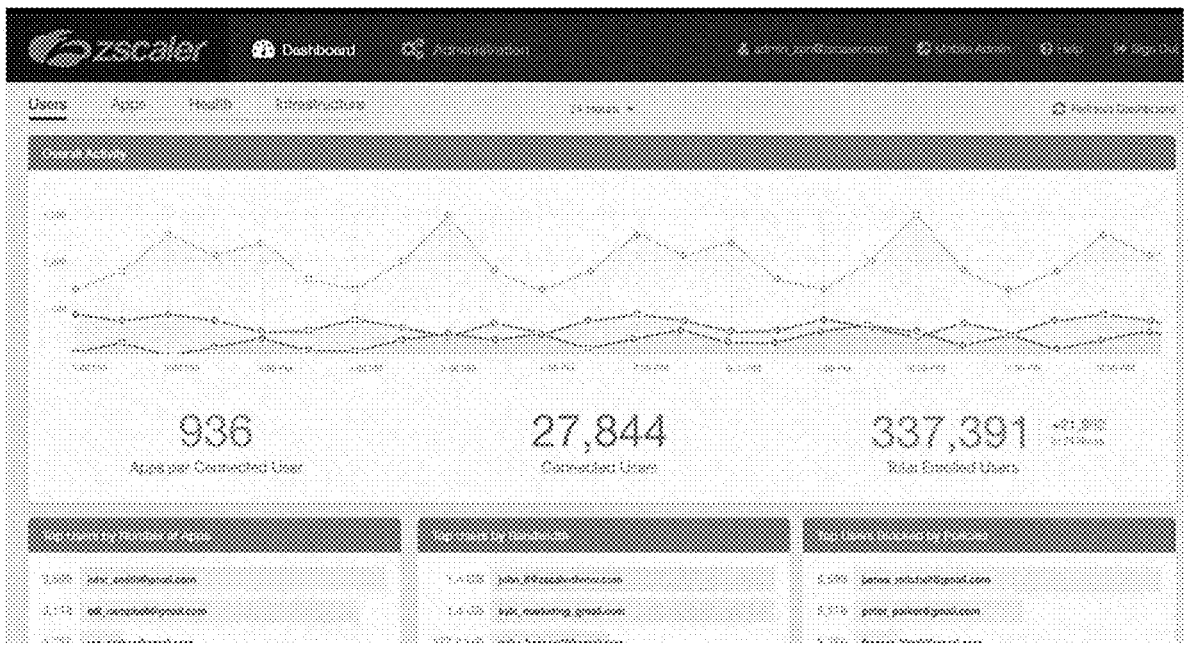

FIGS. 19 and 20 are screenshots of Graphical User Interfaces (GUIs) for administrator access to the virtual private access with FIG. 19 illustrating a GUI of network auto-discovery and FIG. 20 illustrating a GUI for reporting.

Figures 21, 22:

FIG. 21 is a network diagram of the cloud-based system with a private service edge node in an enterprise network.

FIG. 22 is a network diagram illustrating the cloud-based system with private applications and data centers connected thereto to provide virtual private access through the cloud-based system along with different types of users, namely trusted and untrusted users.

Figure 23:
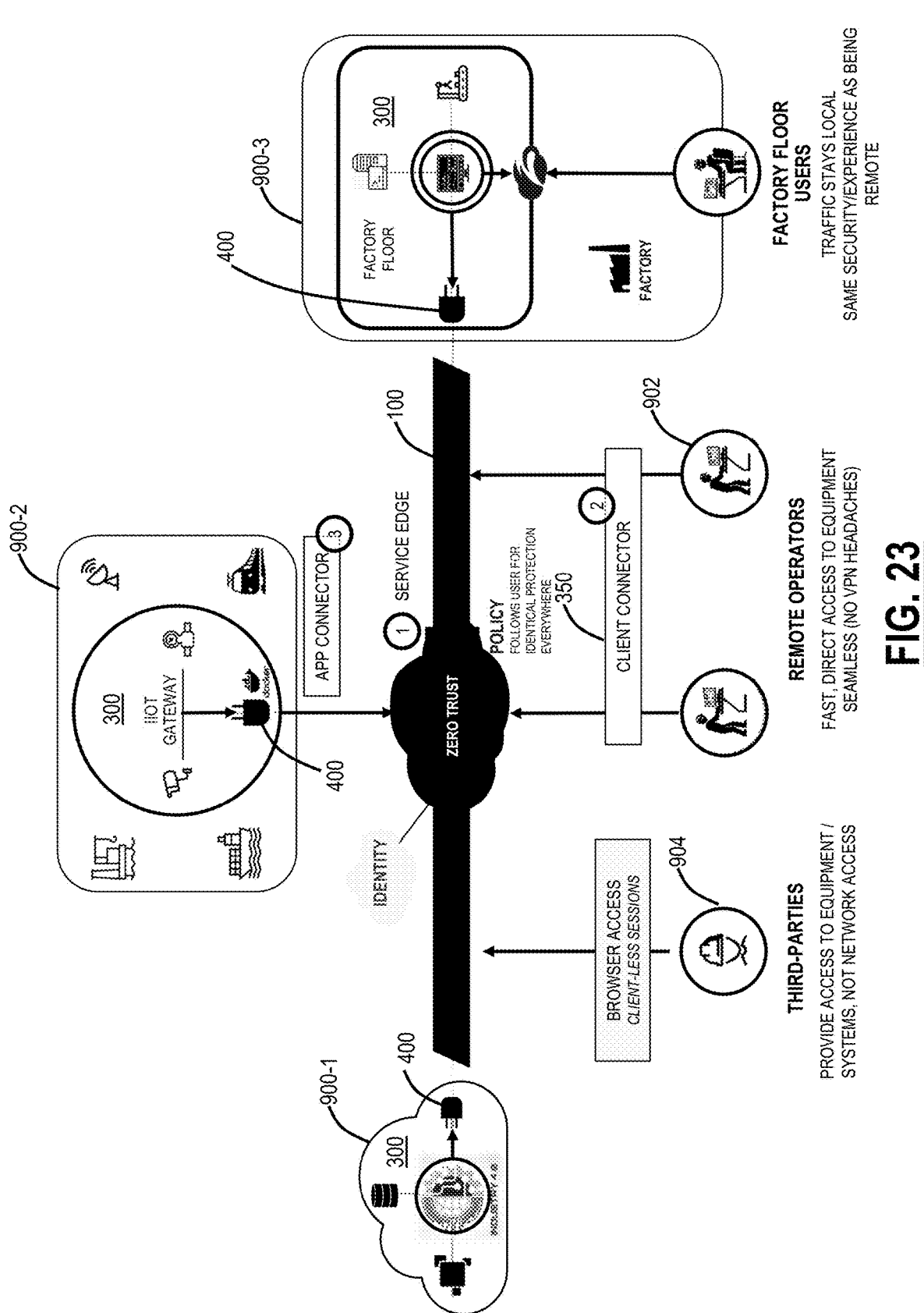

FIG. 23 is a network diagram of the cloud-based system providing privileged remote access for OT/IOT/IIOT/ICS infrastructure.

Figure 24:
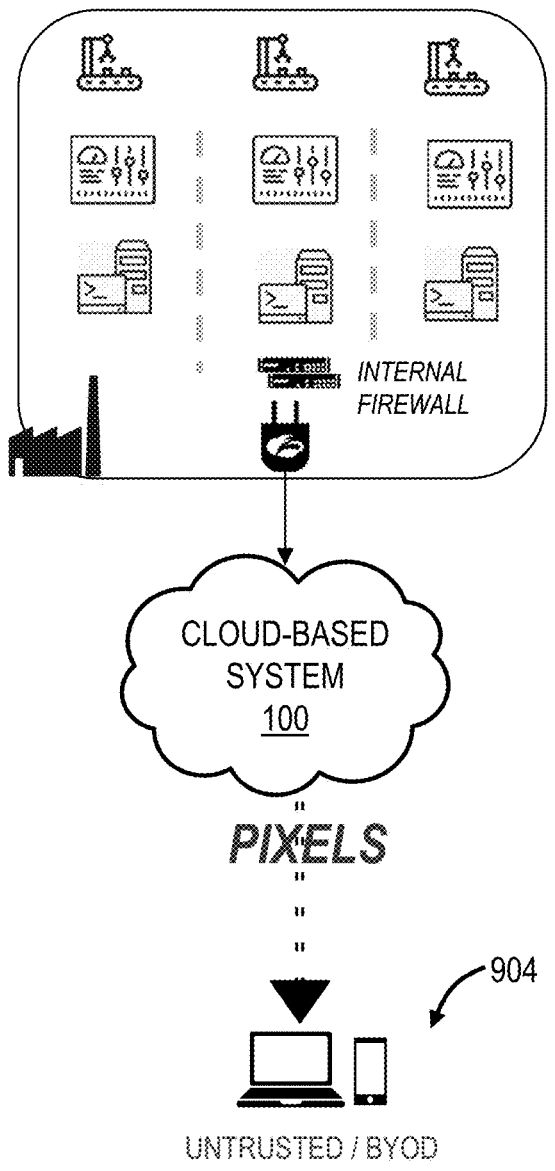

FIG. 24 is a network diagram illustrating use of browser isolation with OT, IOT, IIOT, ICS, etc. type devices.

Figure 25:
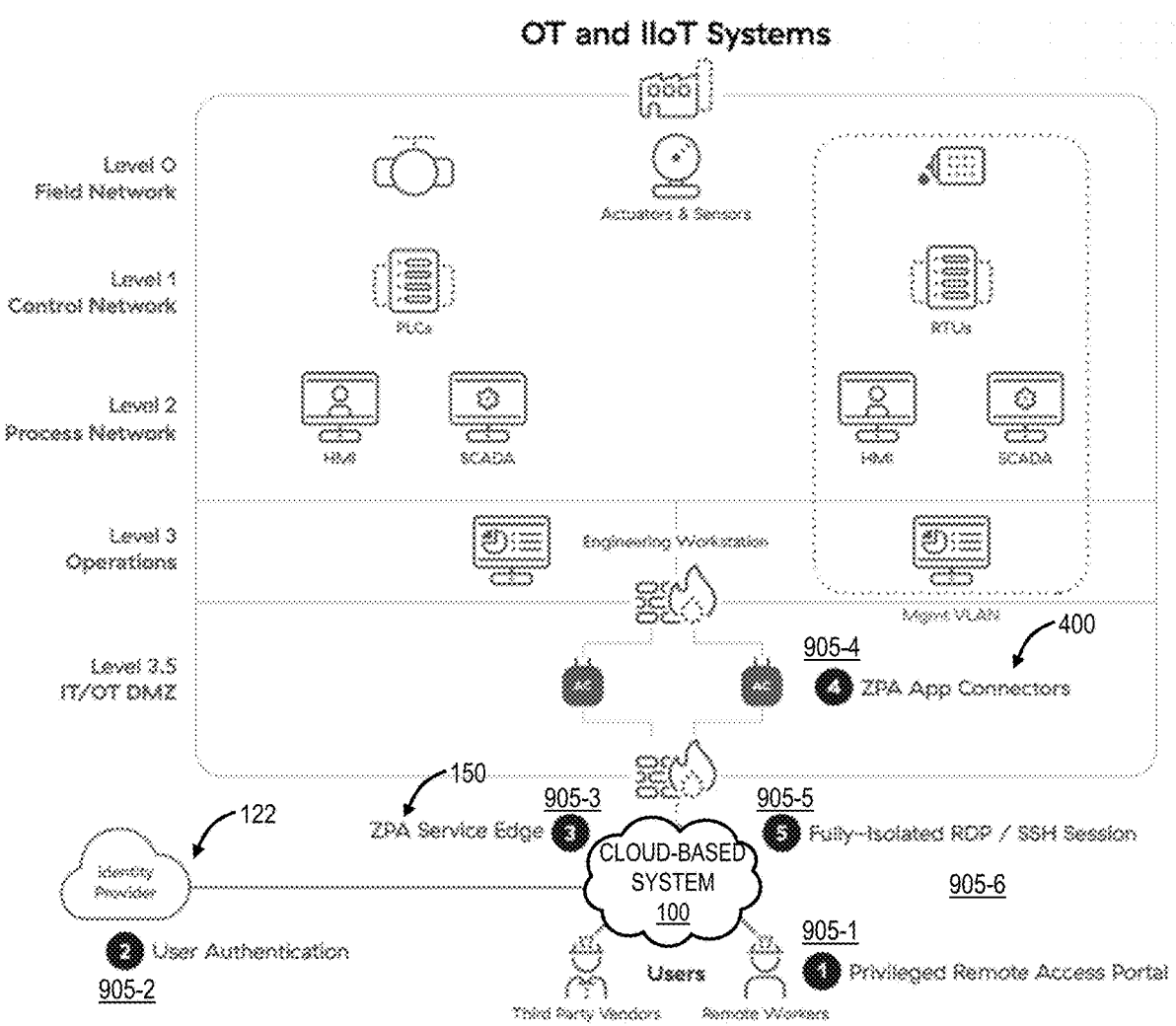

FIG. 25 is a network diagram of the cloud-based system for describing the flow of privileged remote access for OT, IOT, IIOT, ICS, etc. type devices.

Figure 26:
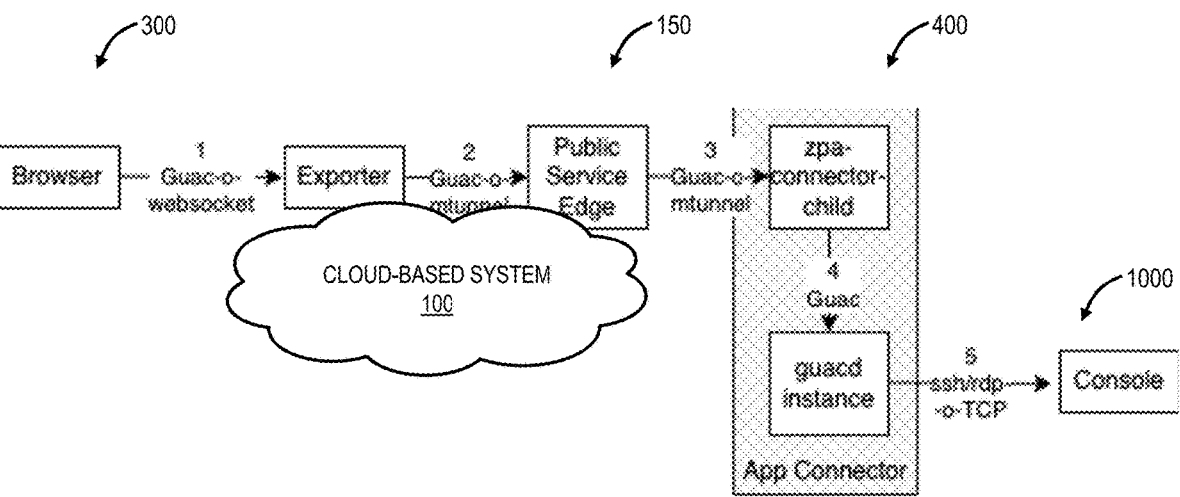

FIG. 26 is a network diagram of a request flow for privileged remote access for OT, IOT, IIOT, ICS, etc. type devices.

Figure 27:
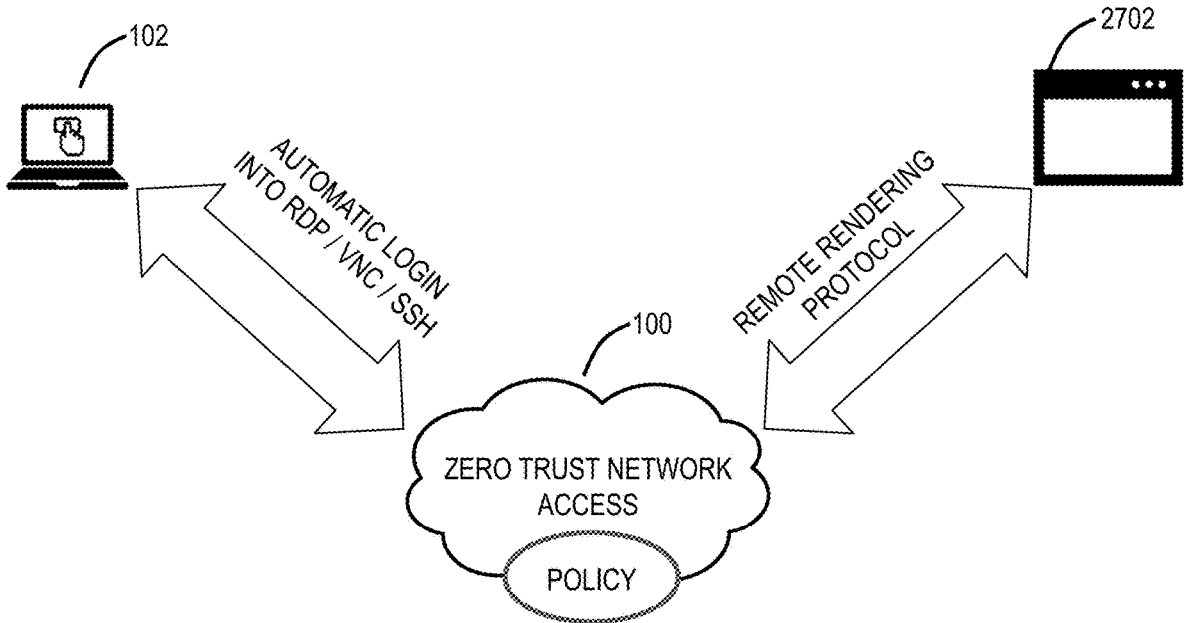

FIG. 27 is a diagram of the cloud-based system 100 adapted to provide policy based authentication for Privileged Remote Access (PRA) systems.

Figure 28:
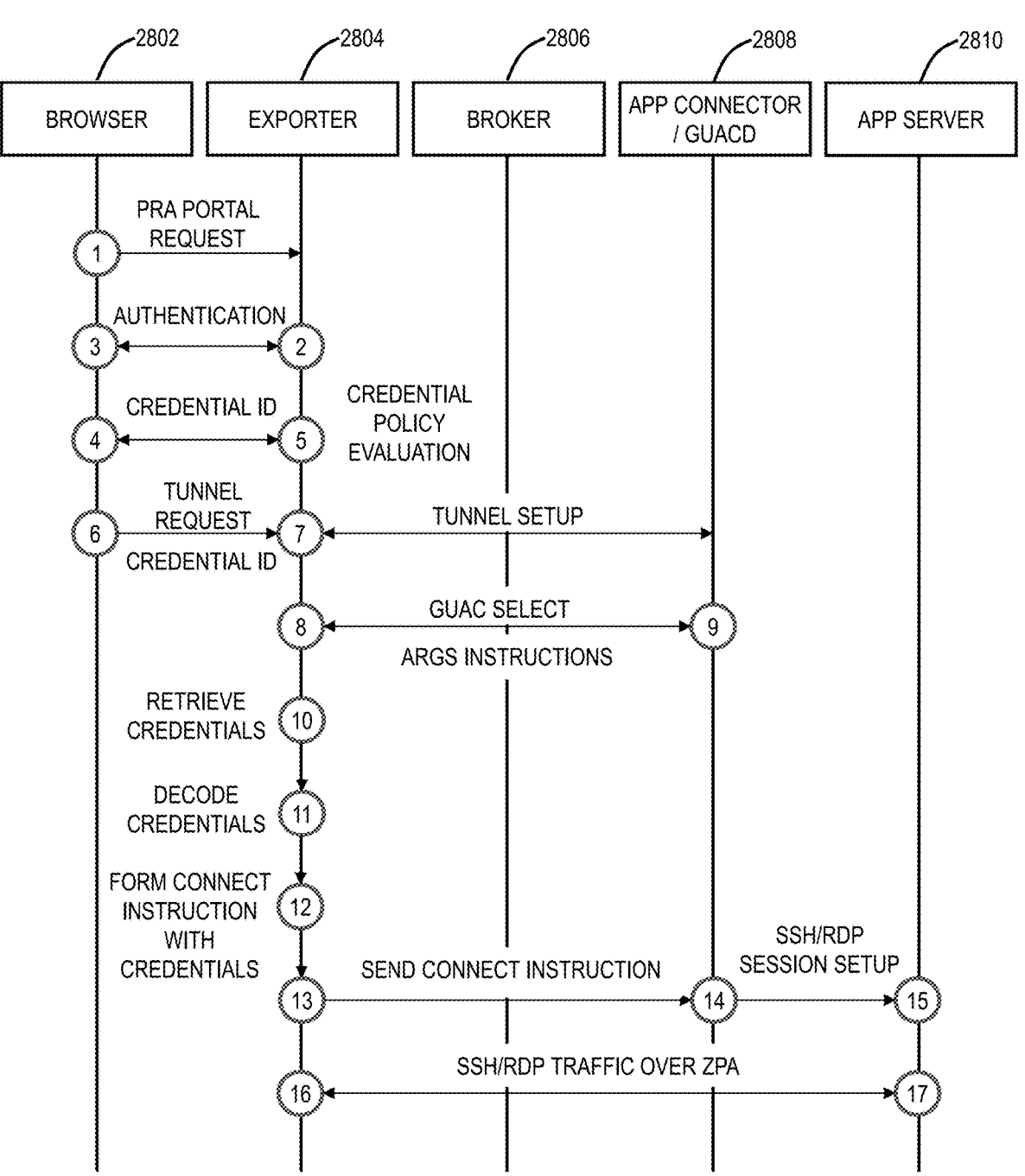

FIG. 28 is a flow diagram for a new credential mapping workflow.

Figure 29:

FIG. 29 is a screenshot of a User Interface (UI) for configuring privileged credentials.

Figure 30:
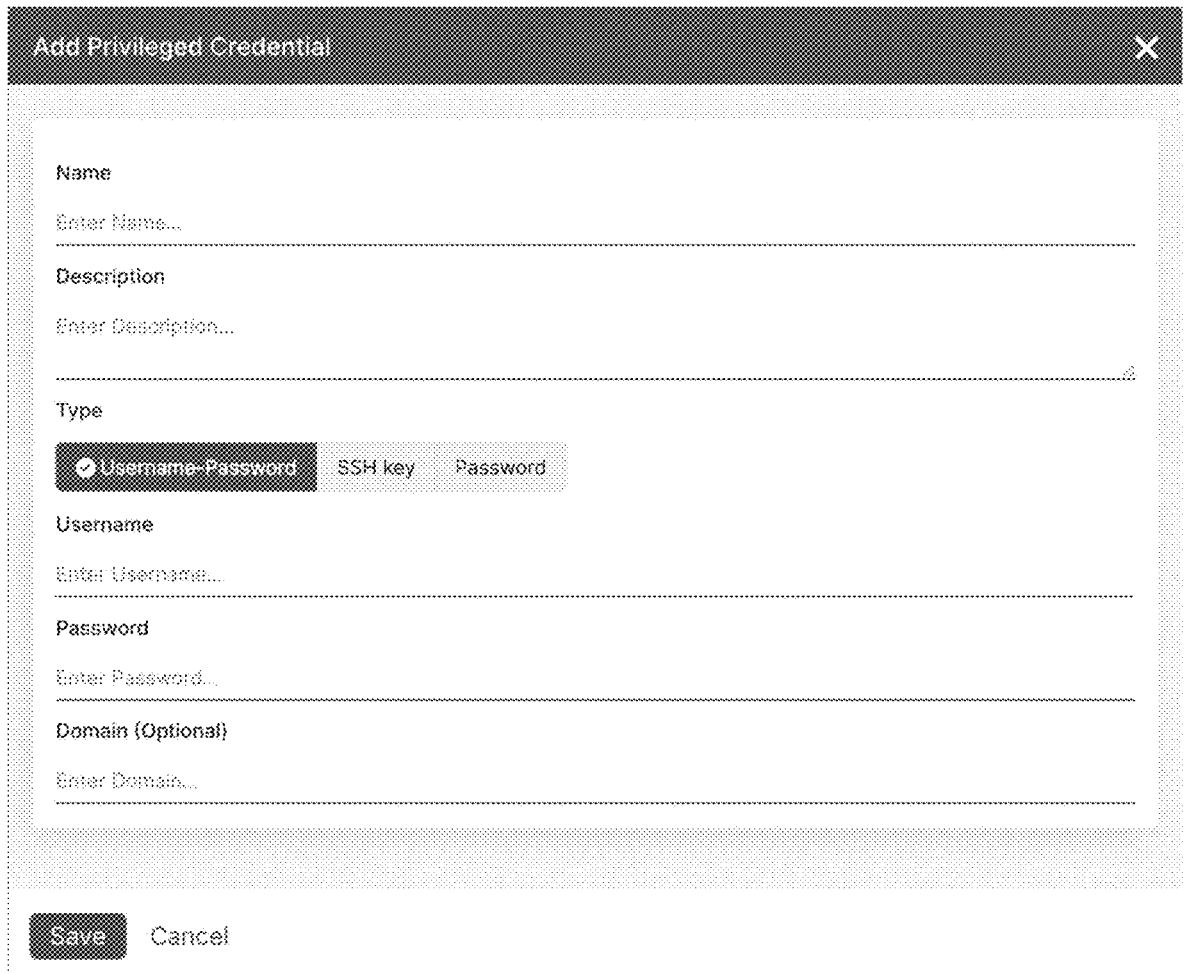

FIG. 30 is a screenshot of a UI for adding privileged credentials.

Figure 31:

FIG. 31 is a screenshot of a window for configuring privileged credential policy.

Figure 32:
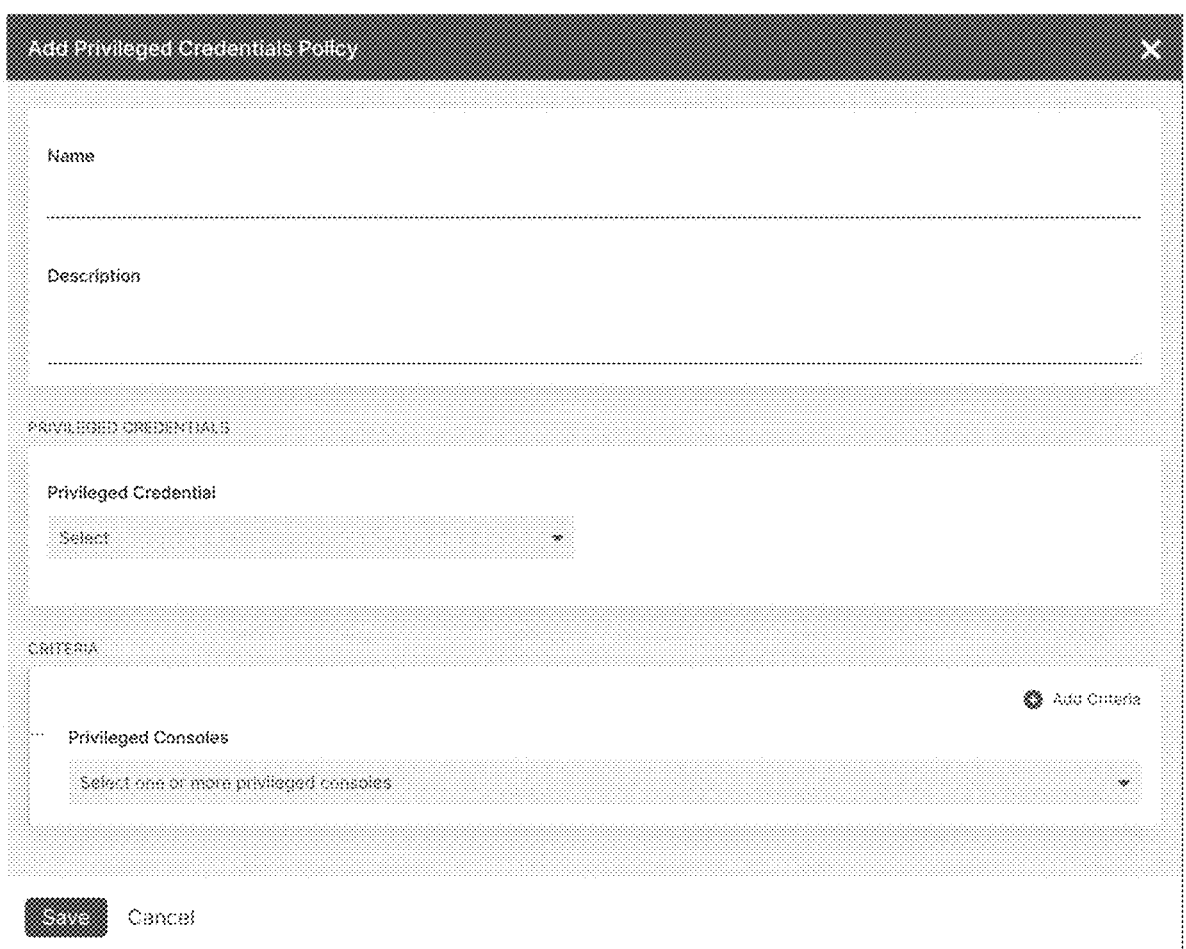

FIG. 32 is a screenshot of a window for adding a new rule.

Figure 33:
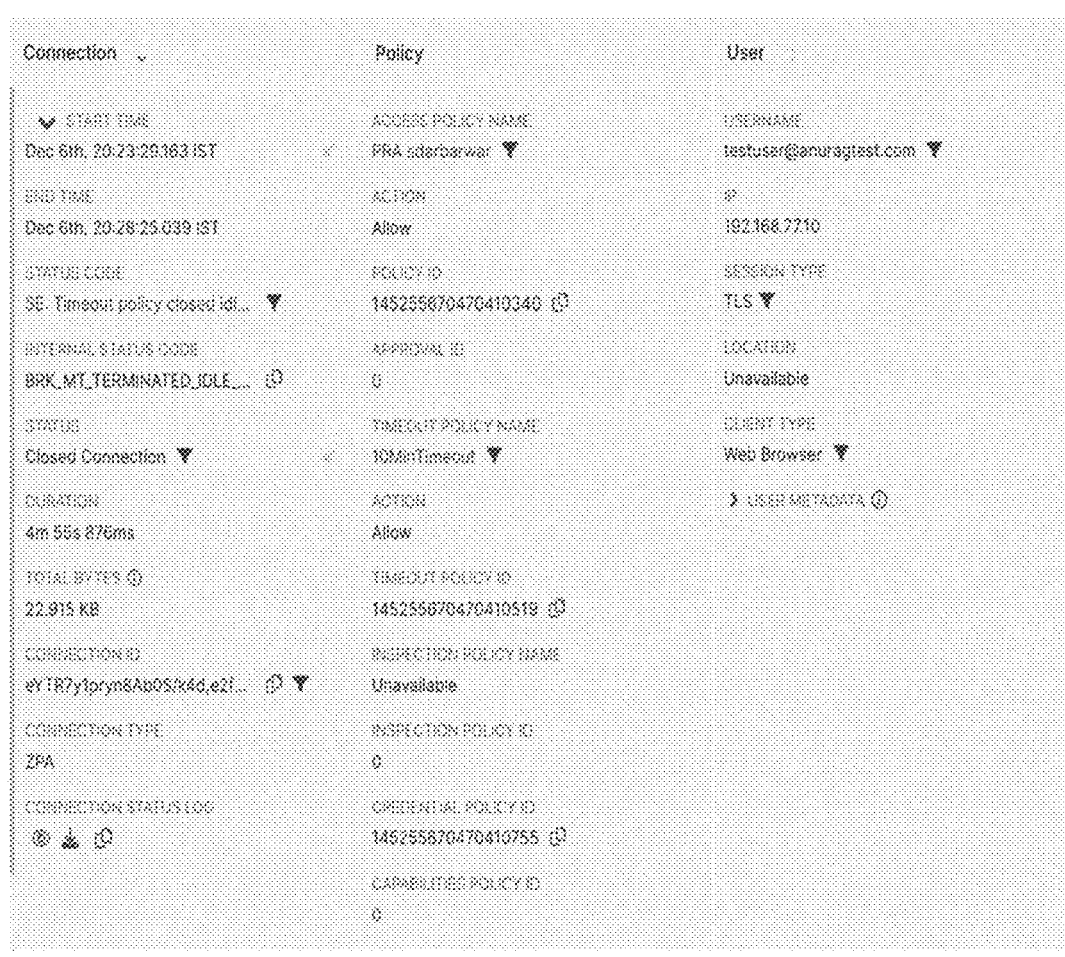

FIG. 33 is a screenshot of a window displaying diagnostic logs.

Figure 34:
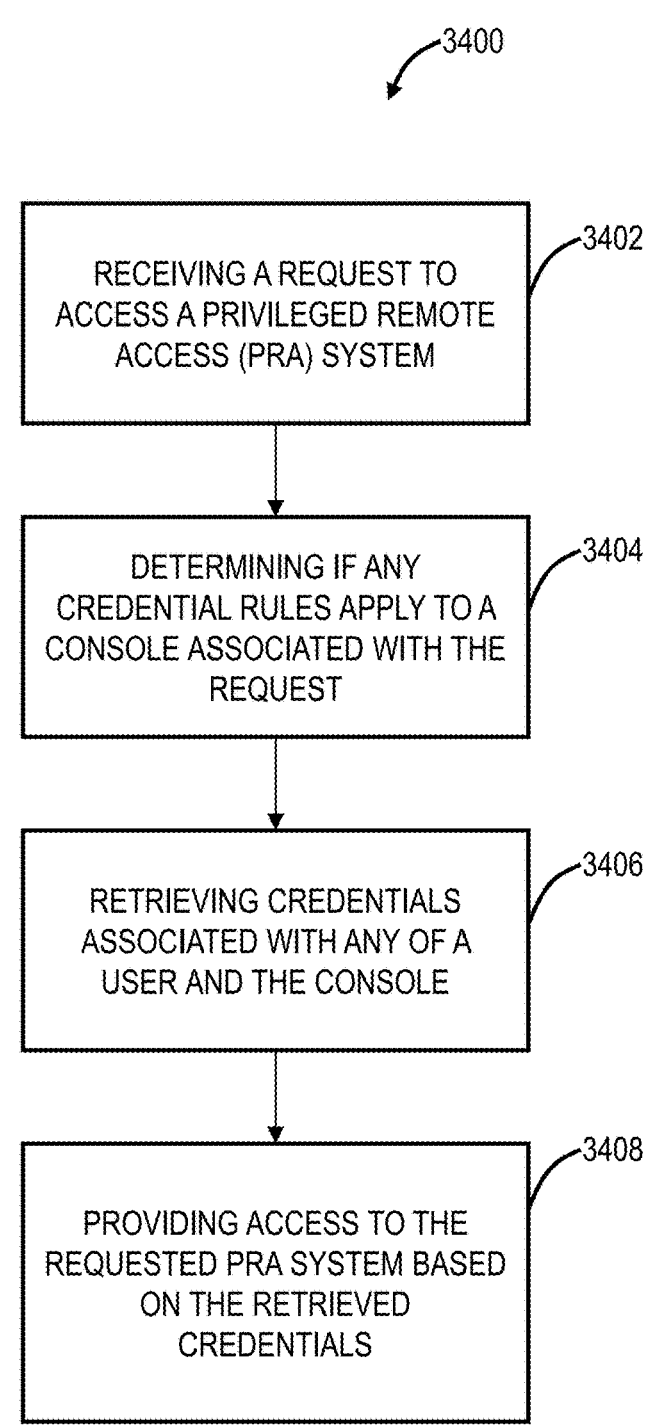

FIG. 34 is a flowchart of a process for policy based authentication for PRA systems.

Figure 35:
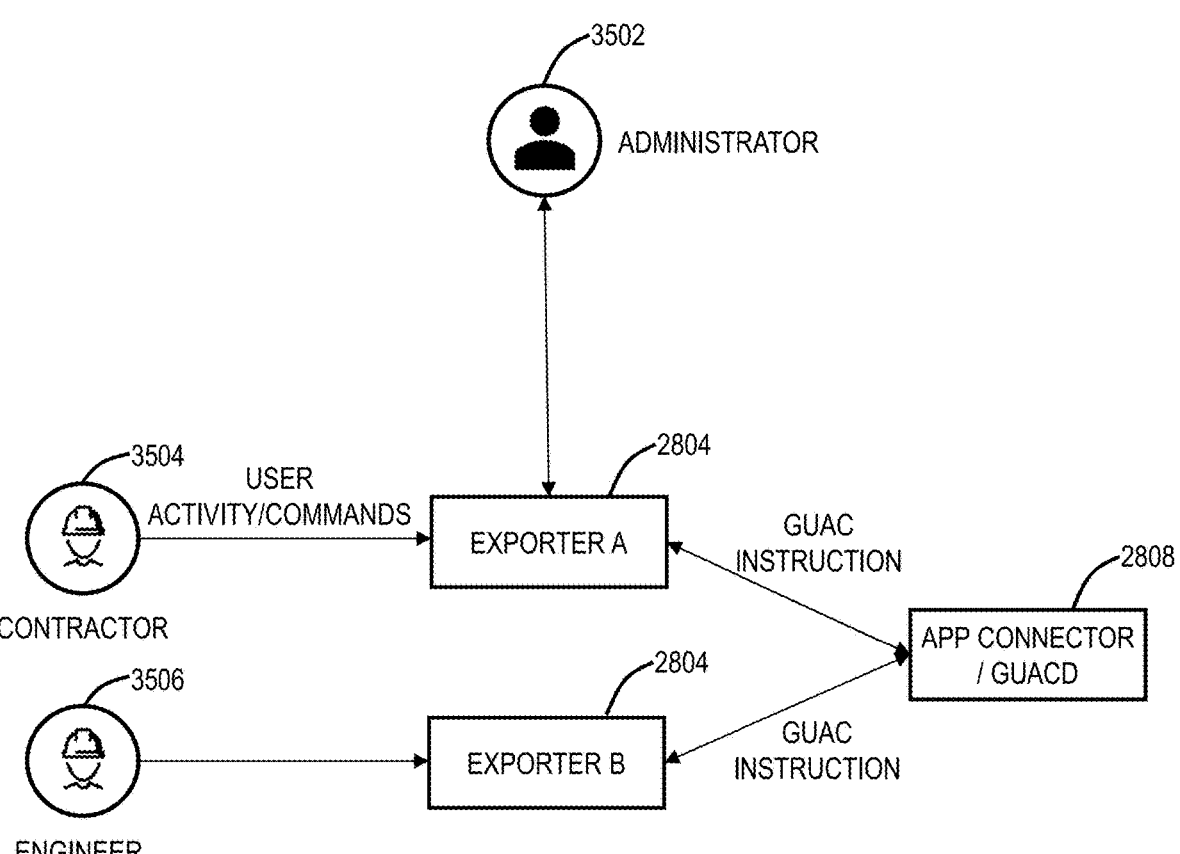

FIG. 35 is a flow diagram depicting an exemplary shared PRA session.

Figure 36:
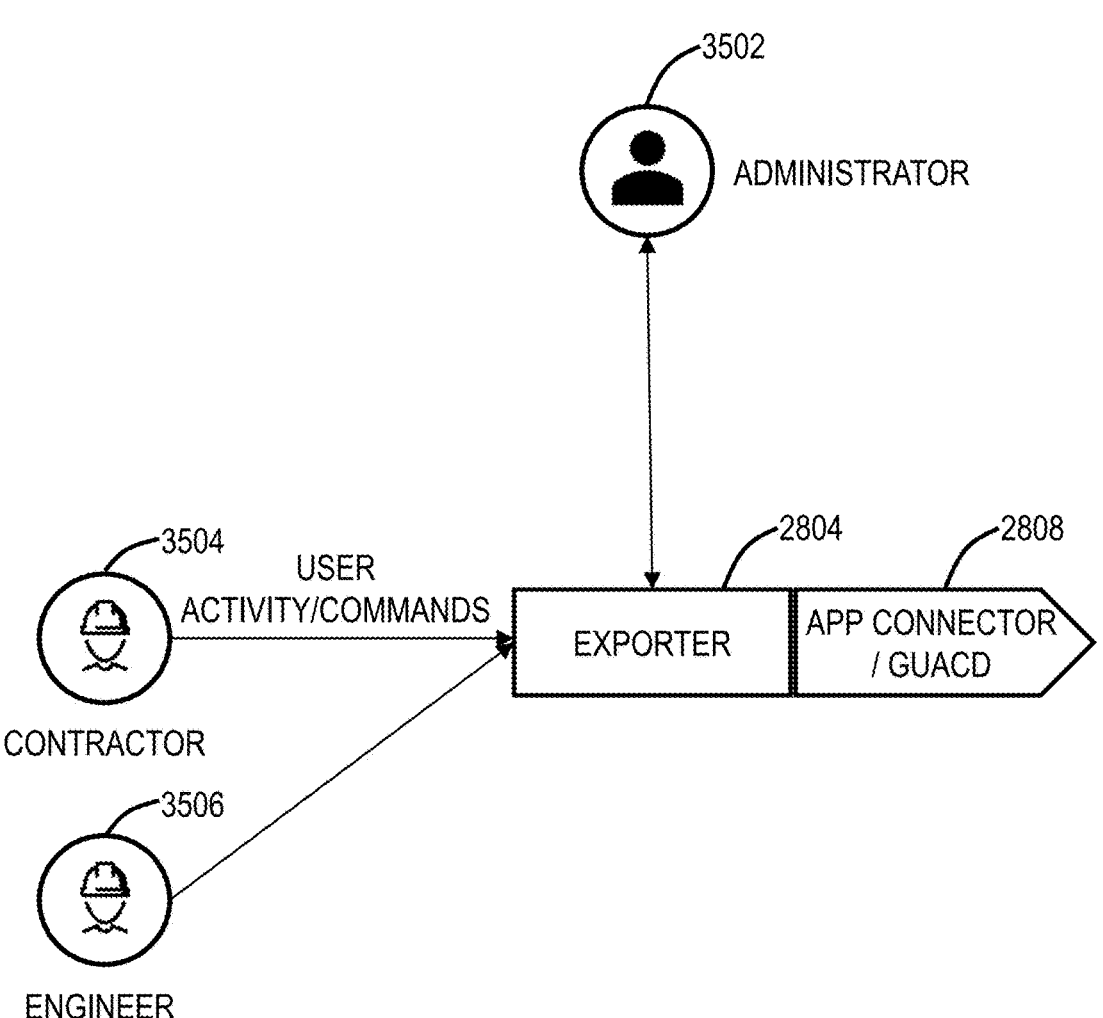

FIG. 36 is a flow diagram of another exemplary shared PRA session.

FIG. 37 is a flowchart of a process for pause and resume functionality in shared PRA sessions.

Figure 38:
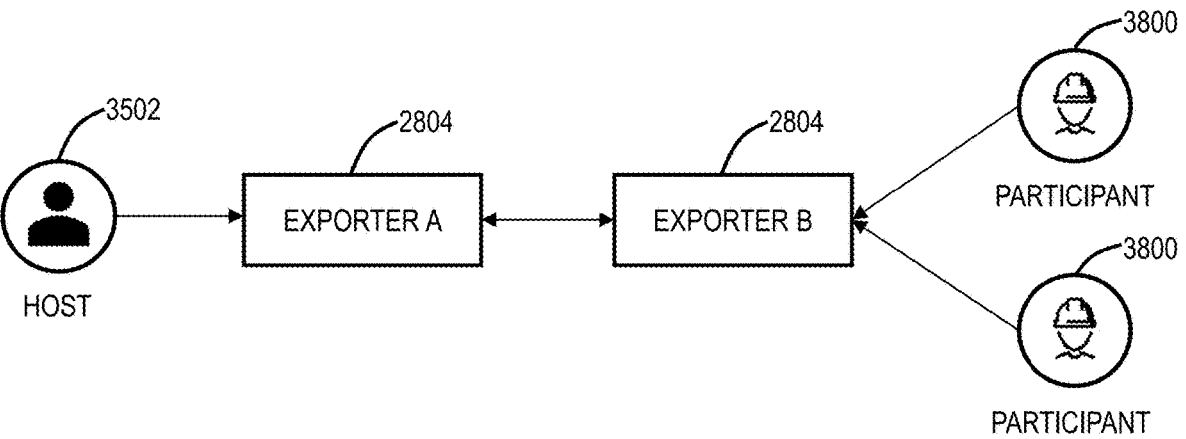

FIG. 38 is a diagram of a typical shared PRA session.

Figure 39:
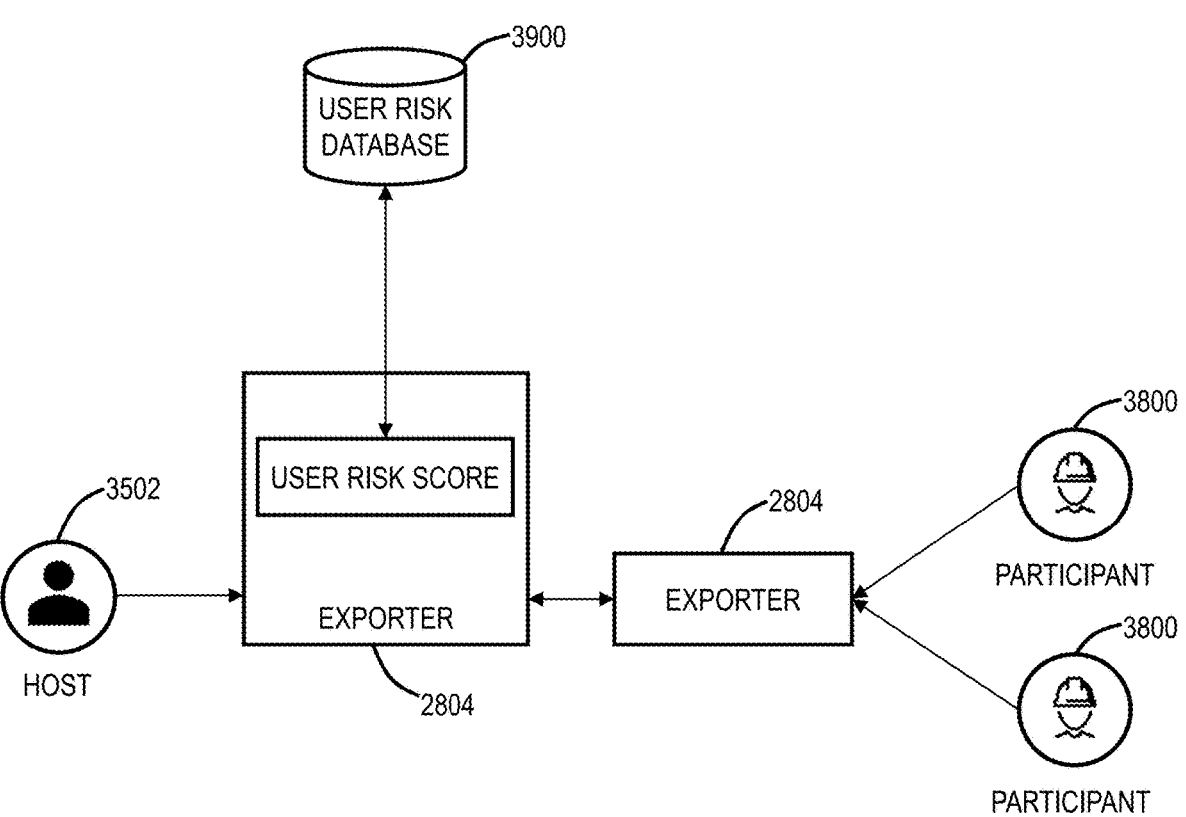

FIG. 39 is a diagram of an embodiment of the present systems and methods for protecting shared PRA sessions.

FIG. 40 is a flow chart of a process for protecting shared PRA sessions based on user risk.

DETAILED DESCRIPTION OF THE DISCLOSURE

ZPA is a cloud service that provides seamless, zero trust access to private applications running on the public cloud, within the data center, within an enterprise network, etc. As described herein, ZPA is referred to as zero trust access to private applications or simply a zero trust access service. Here, applications are never exposed to the Internet, making them completely invisible to unauthorized users. The service enables the applications to connect to users via inside-out connectivity versus extending the network to them. Users are never placed on the network. This Zero Trust Network Access (ZTNA) approach supports both managed and unmanaged devices and any private application (not just web apps).

OT/IOT/IIOT infrastructure provides unique threats to enterprises (industrial, factories, warehouses, etc.). These enterprises are widely deploying OT/IOT/IIOT infrastructure to improve operations, productivity, etc. Further, with 5G connectivity, there is an opportunity to connect everything. For IOT/IIOT devices, the traffic flow is from the device to the cloud or Internet. Disadvantageously, this provides threats for ransomware, data leaks, entry points for attacks, etc. For IIOT/OT/ICS, the traffic flow is from operators to devices and from the device to the cloud or Internet. Disadvantageously, this provides threats for safety, loss of revenue, etc.

Again, the present disclosure relates to systems and methods for privileged remote access for Operational Technology (OT)/Internet of Things (IOT)/Industrial IOT (IIOT)/Industrial Control System (ICS) infrastructure. In particular, the present disclosure includes a cloud-based system that extends zero trust to OT, IOT, IIOT, ICS, etc. This allows secure remote access for OT systems for third-parties to perform remote monitoring and maintenance, secure Internet access for OT systems for OT/IT convergence and patch management of OT systems, secure for access for industrial edge compute for vendor access into OT edge compute platforms for management/monitoring, secure OT-to-cloud applications for OT inventory real-time data for business analytics, secure IIOT device-to-cloud/application access, such as for Point of Sale (POS) Systems, smart glasses, handhelds for inventory management, and the like.

Also, systems and methods for cloud-based virtual private access of networked applications are described. At a high level, the systems and methods dynamically create a connection through a secure tunnel between three entities: an end-point, a cloud, and an on-premises redirection proxy. The connection between the cloud and on-premises proxy is dynamic, on-demand and orchestrated by the cloud. A key feature of the systems and methods is its security at the edge—there is no need to punch any holes in the existing on-premises firewall. The redirection proxy inside the enterprise (on premises) "dials out" and connects to the cloud as if it too were an end-point. This on-demand dial-out capability and tunneling authenticated traffic back to the enterprise is a key differentiator of the systems and methods.

The paradigm of the virtual private access systems and methods is to give users network access to get to an application, not to the entire network. If a user is not authorized to get the application, the user should not be able to even see that it exists, much less access it. The virtual private access systems and methods provide a new approach to deliver secure access by decoupling applications from the network, instead providing access with a lightweight software connector, in front of the applications, an application on the user device, a central authority to push policy, and a cloud to stitch the applications and the software connectors together, on a per-user, per-application basis.

With the virtual private access, users can only see the specific applications allowed by policy. Everything else is "invisible" or "dark" to them. Because the virtual private access separates the application from the network, the physical location of the application becomes irrelevant-if applications are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy because the virtual private access is a service offering to users and enterprises.

Example Cloud-Based System Architecture

Figure 1A:
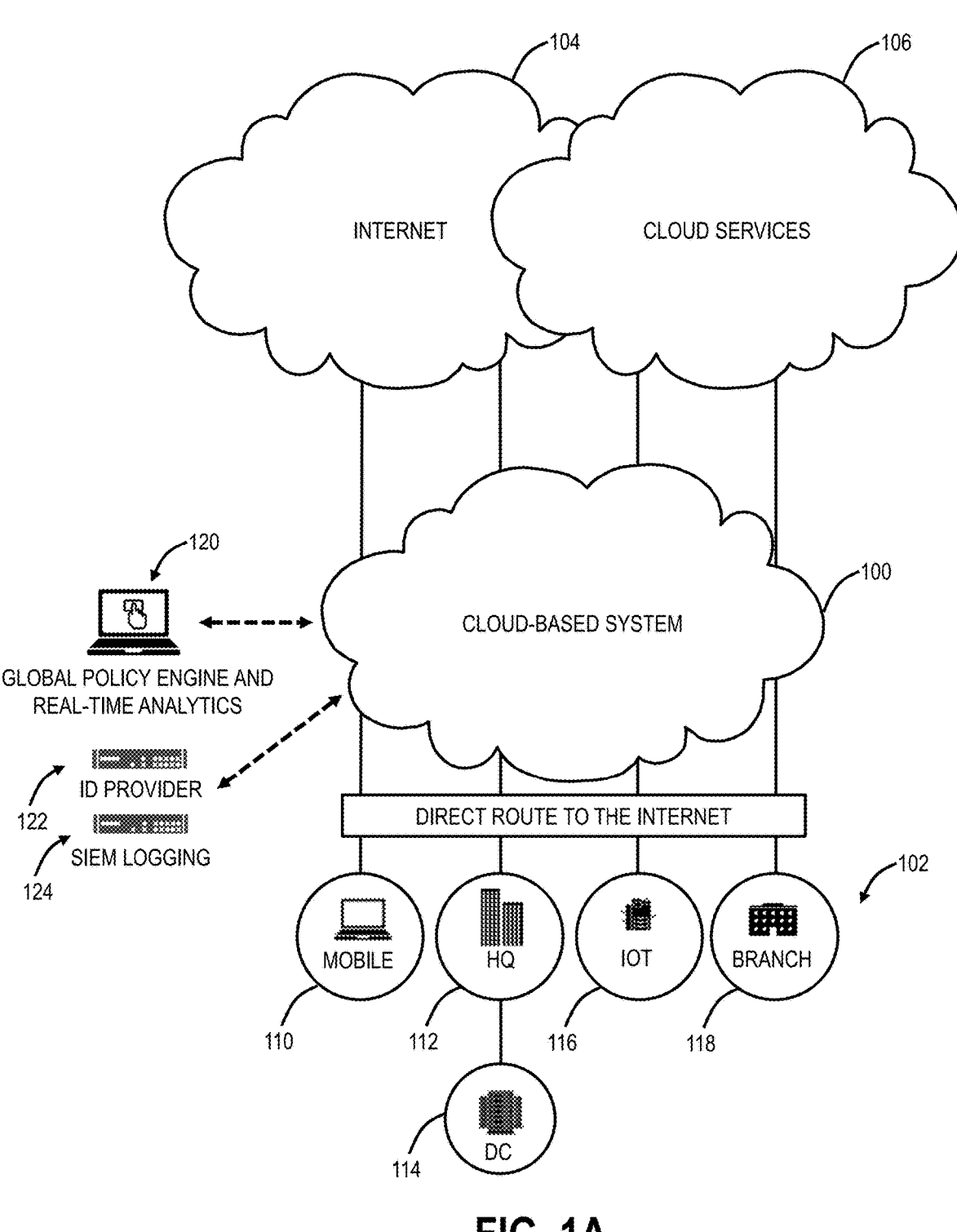
FIG. 1A is a network diagram of a cloud-based system offering security as a service.

FIG. 1A is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, anti-malware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 5:
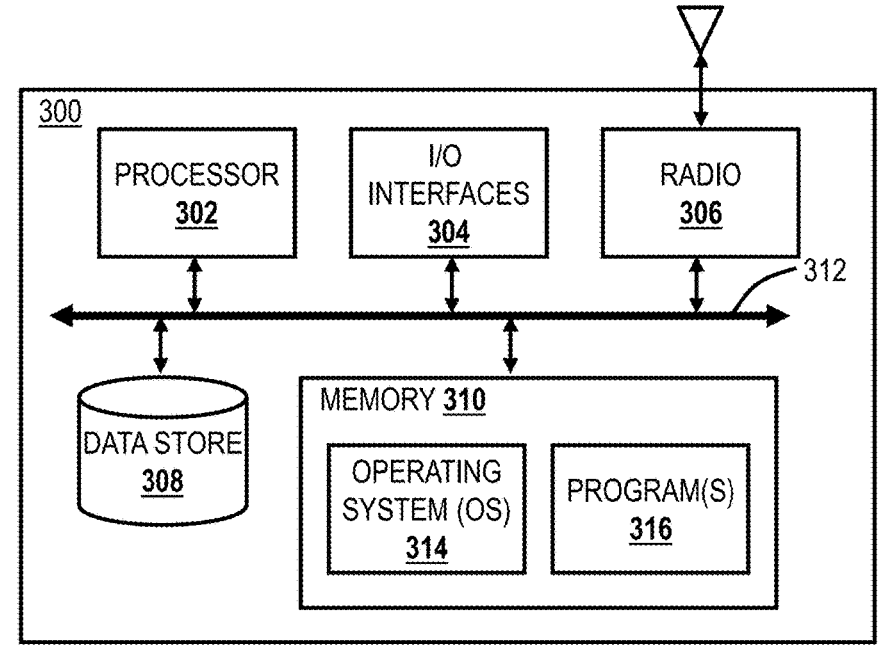

For illustration purposes, the users 102 of the cloud-based system 100 can include a mobile device 110, a headquarters (HQ) 112 which can include or connect to a data center (DC) 114, Internet of Things (IOT) devices 116, a branch office/remote location 118, etc., and each includes one or more user devices (an example user device 300 is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes-they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Zero Trust

Figure 1B:
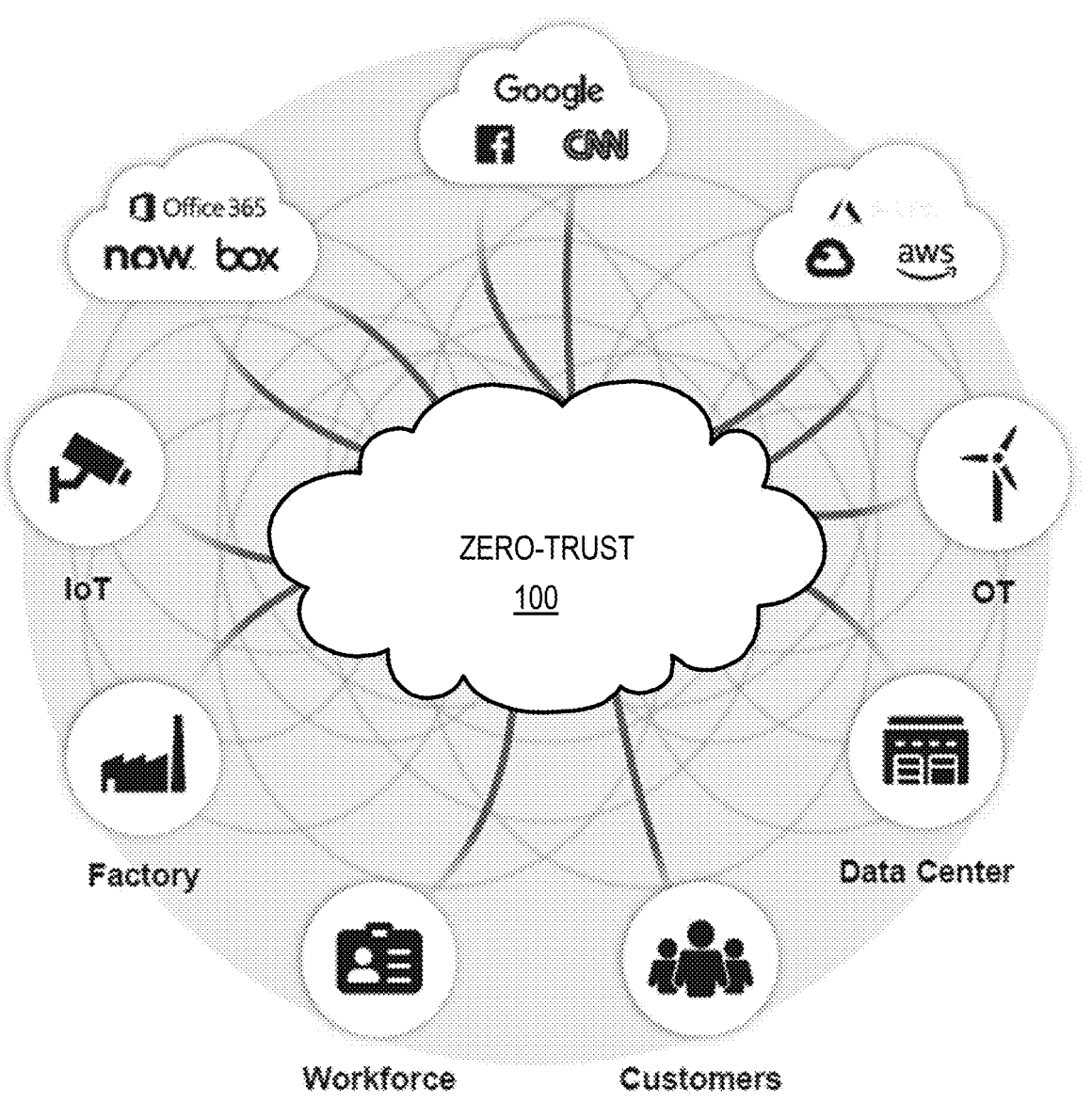
FIG. 1B is a logical diagram of the cloud-based system operating as a zero-trust platform.

FIG. 1B is a logical diagram of the cloud-based system 100 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud-based system 100. Zero trust is a cybersecurity strategy wherein security policy is applied based on context established through least-privileged access controls and strict user authentication—not assumed trust. A well-tuned zero trust architecture leads to simpler network infrastructure, a better user experience, and improved cyberthreat defense.

Establishing a zero trust architecture requires visibility and control over the environment's users and traffic, including that which is encrypted; monitoring and verification of traffic between parts of the environment; and strong multi-factor authentication (MFA) methods beyond passwords, such as biometrics or one-time codes. This is performed via the cloud-based system 100. Critically, in a zero trust architecture, a resource's network location is not the biggest factor in its security posture anymore. Instead of rigid network segmentation, your data, workflows, services, and such are protected by software-defined microsegmentation, enabling you to keep them secure anywhere, whether in your data center or in distributed hybrid and multicloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time—before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

Figure 1C:
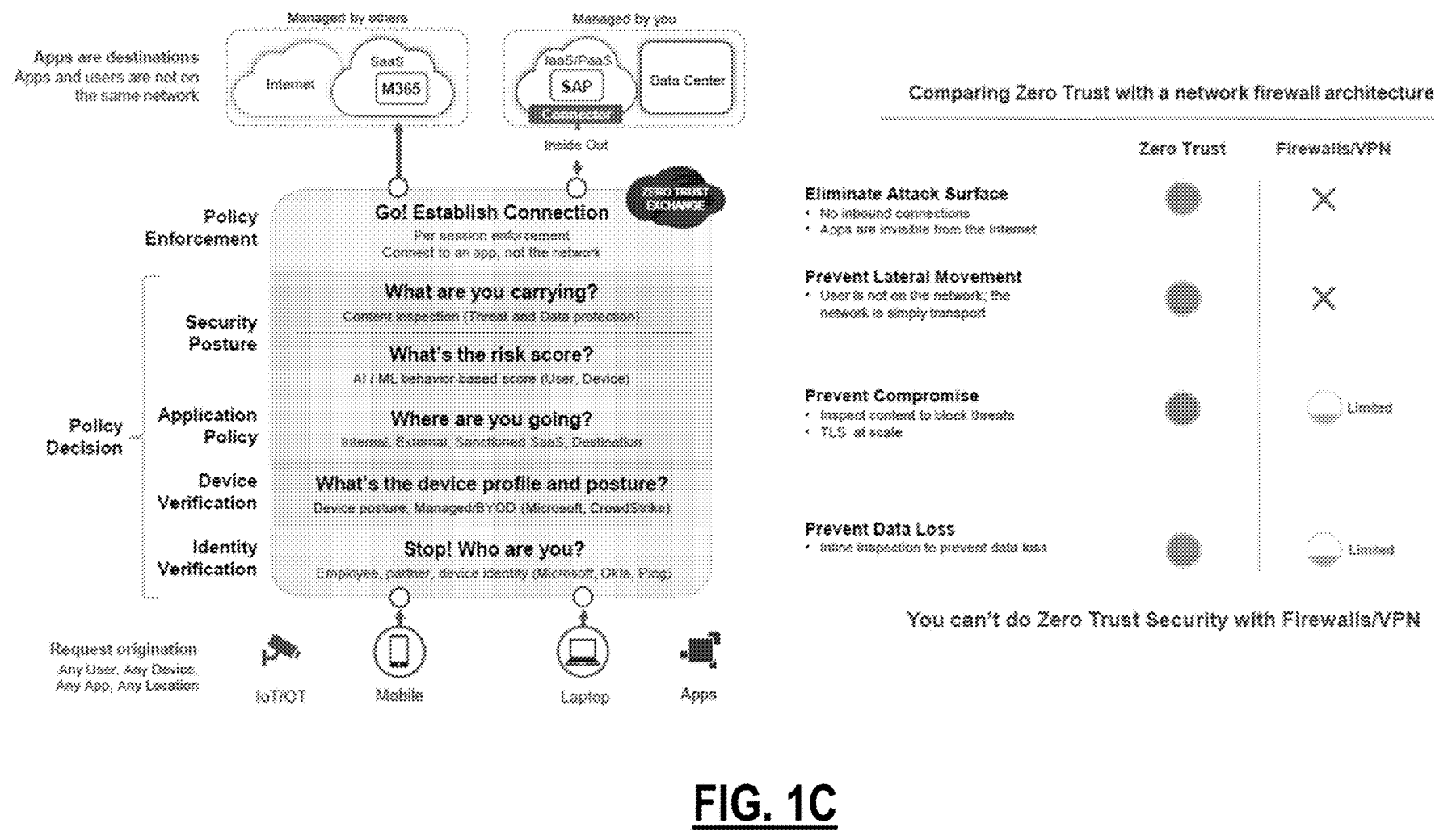

FIG. 1C is a logical diagram illustrating zero trust policies with the cloud-based system 100 and a comparison with the conventional firewall-based approach. Zero trust with the cloud-based system 100 allows per session policy decisions and enforcement regardless of the user 102 location. Unlike the conventional firewall-based approach, this eliminates attack surfaces, there are no inbound connections; prevents lateral movement, the user is not on the network; prevents compromise, allowing encrypted inspection; and prevents data loss with inline inspection.

Example Implementation of the Cloud-Based System

Figure 2:
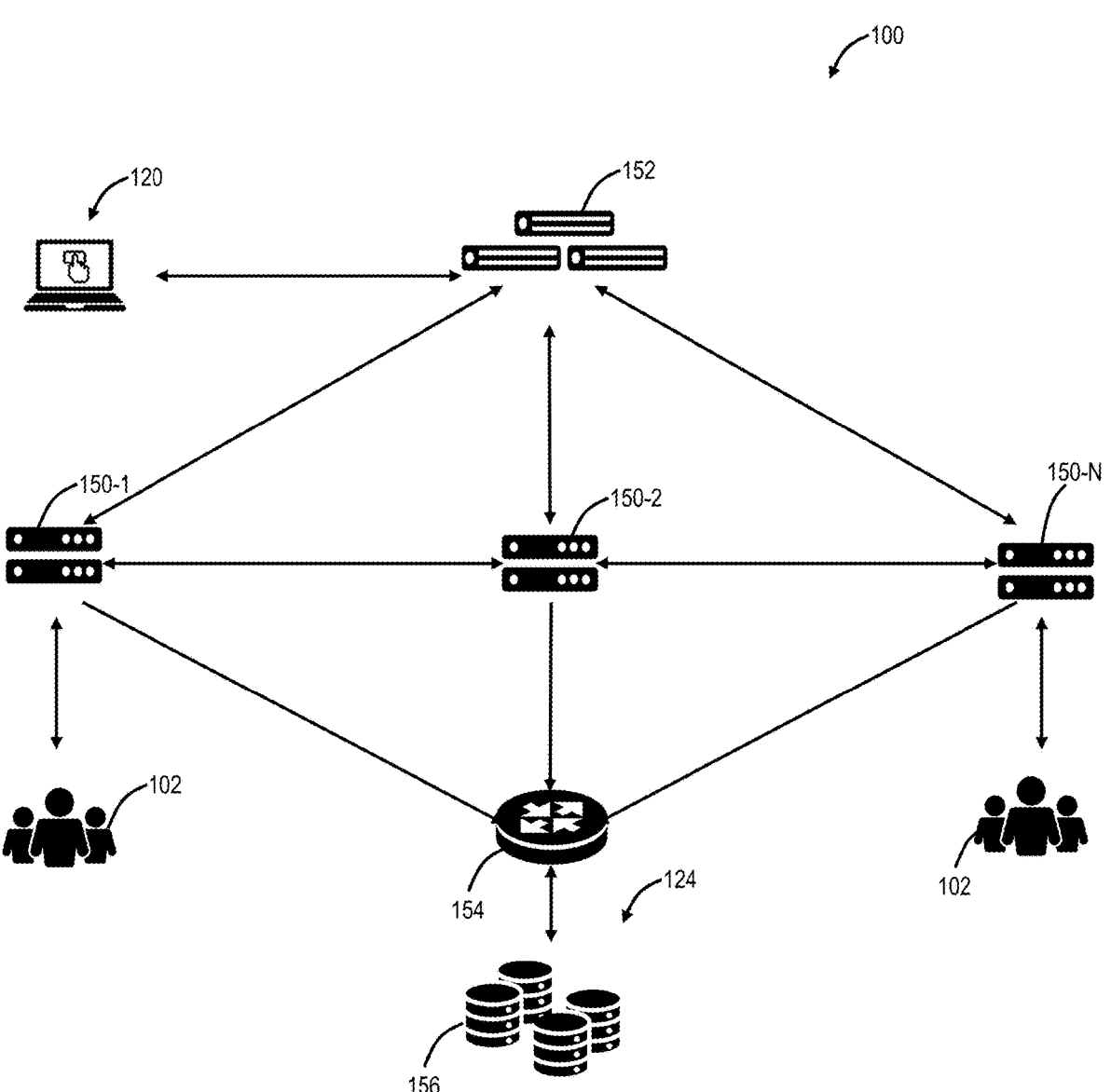
FIG. 2 is a network diagram of an example implementation of the cloud-based system.
Figure 4:
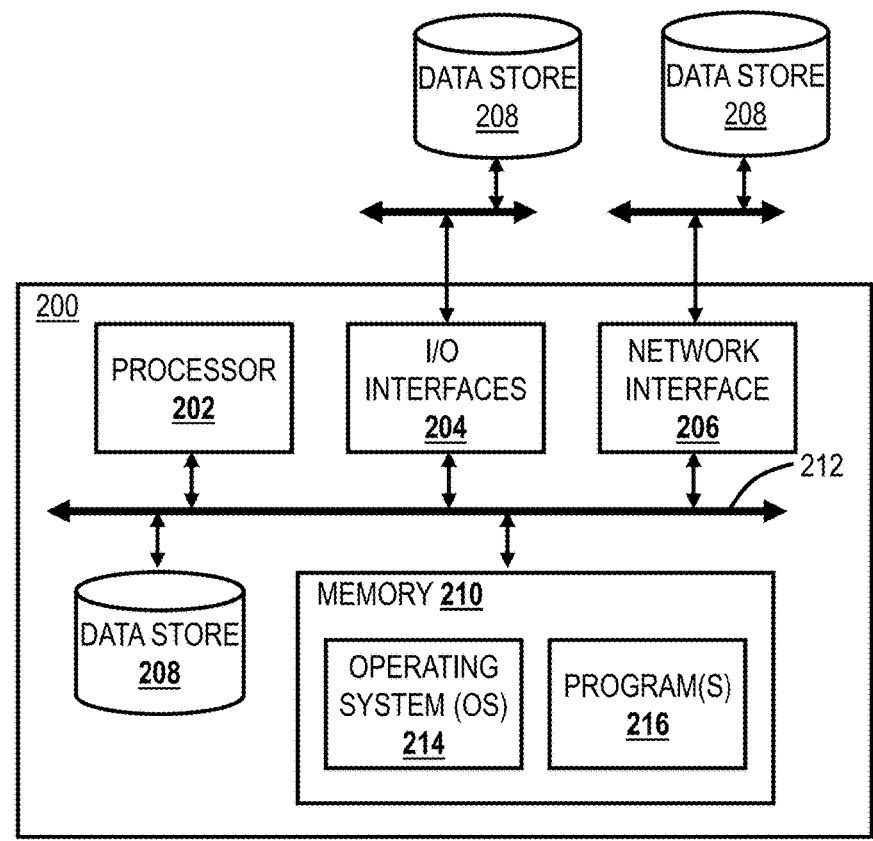
FIG. 4 is a block diagram of a server, which may be used in the cloud-based system, in other systems, or standalone.

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150.

Of note, the cloud-based system 100 is an external system meaning it is separate from tenant's private networks (enterprise networks) as well as from networks associated with the devices 110, 116, and locations 112, 118. Also, of note, the present disclosure describes a private enforcement node 150P that is both part of the cloud-based system 100 and part of a private network. Further, of note, the enforcement node described herein may simply be referred to as a node or cloud node. Also, the terminology enforcement node 150 is used in the context of the cloud-based system 100 providing cloud-based security. In the context of secure, private application access, the enforcement node 150 can also be referred to as a service edge or service edge node. Also, a service edge node 150 can be a public service edge node (part of the cloud-based system 100) separate from an enterprise network or a private service edge node (still part of the cloud-based system 100) but hosted either within an enterprise network, in a data center 114, in a branch office 118, etc. Further, the term nodes as used herein with respect to the cloud-based system 100 (including enforcement nodes, service edge nodes, etc.) can be one or more servers, including physical servers, virtual machines (VM) executed on physical hardware, etc., as described above. The service edge node 150 can also be a Secure Access Service Edge (SASE).

The enforcement nodes 150 are full-featured secure internet gateways that provide integrated internet security. They inspect all web traffic bi-directionally for malware and enforce security, compliance, and firewall policies, as described herein, as well as various additional functionality. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is processed through one of the enforcement nodes 150.

Each of the enforcement nodes 150 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part $C=[c1, c2, \ldots, cm]$ of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QOS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

User Device Application for Traffic Forwarding and Monitoring

Figure 3:
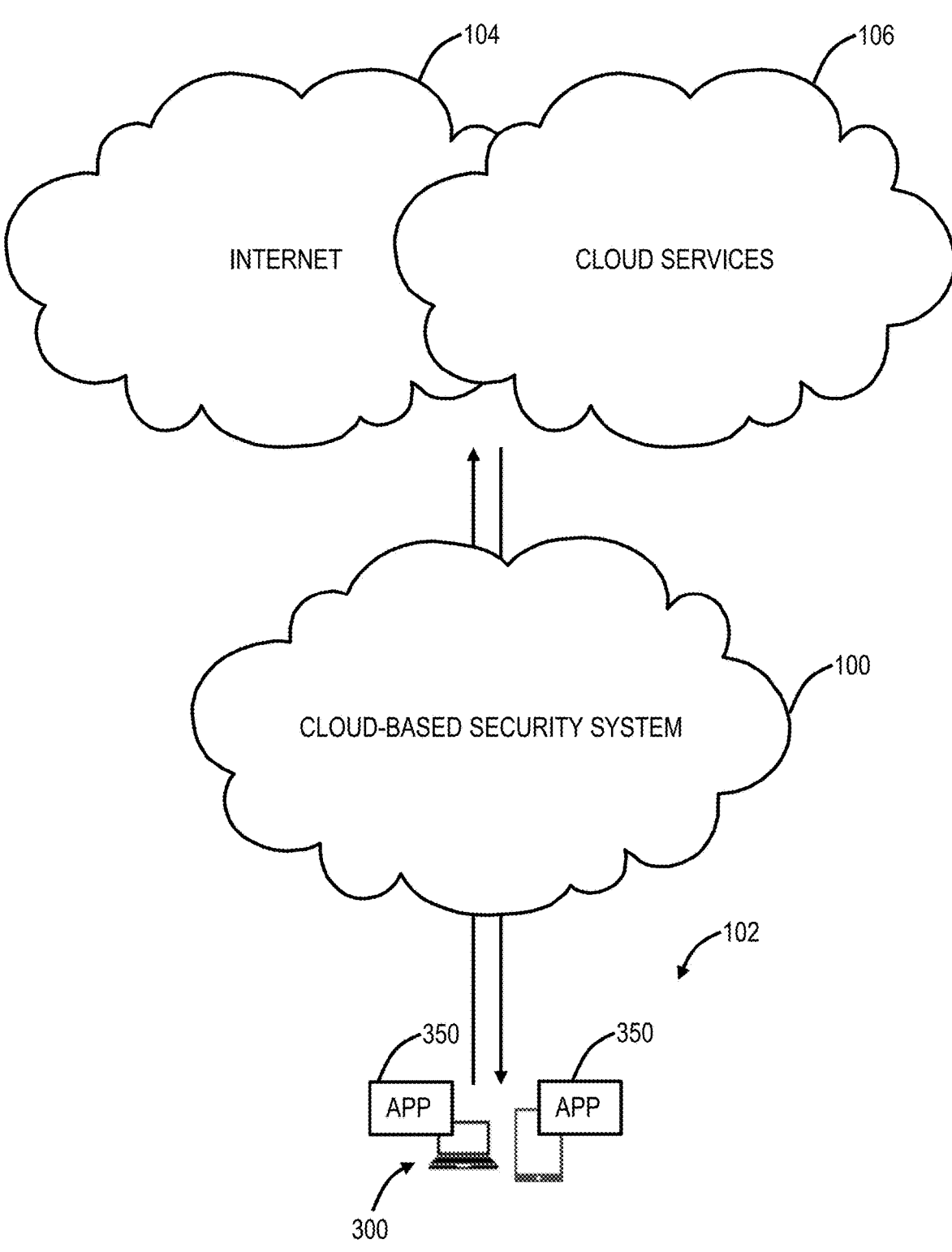
FIG. 3 is a network diagram of the cloud-based system illustrating an application on the user devices with users configured to operate through the cloud-based system.

FIG. 3 is a network diagram of the cloud-based system 100 illustrating an application 350 on user devices 300 with users 102 configured to operate through the cloud-based system 100. Different types of user devices 300 are proliferating, including Bring Your Own Device (BYOD) as well as IT-managed devices. The conventional approach for a user device 300 to operate with the cloud-based system 100 as well as for accessing enterprise resources includes complex policies, VPNs, poor user experience, etc. The application 350 can automatically forward user traffic with the cloud-based system 100 as well as ensuring that security and access policies are enforced, regardless of device, location, operating system, or application. The application 350 automatically determines if a user 102 is looking to access the open Internet 104, a SaaS app, or an internal app running in public, private, or the datacenter and routes mobile traffic through the cloud-based system 100. The application 350 can support various cloud services, including ZIA, ZPA, ZDX, etc., allowing the best in class security with zero trust access to internal apps. As described herein, the application 350 can also be referred to as a connector application.

The application 350 is configured to auto-route traffic for seamless user experience. This can be protocol as well as application-specific, and the application 350 can route traffic with a nearest or best fit enforcement node 150. Further, the application 350 can detect trusted networks, allowed applications, etc. and support secure network access. The application 350 can also support the enrollment of the user device 300 prior to accessing applications. The application 350 can uniquely detect the users 102 based on fingerprinting the user device 300, using criteria like device model, platform, operating system, etc. The application 350 can support Mobile Device Management (MDM) functions, allowing IT personnel to deploy and manage the user devices 300 seamlessly. This can also include the automatic installation of client and SSL certificates during enrollment. Finally, the application 350 provides visibility into device and app usage of the user 102 of the user device 300.

The application 350 supports a secure, lightweight tunnel between the user device 300 and the cloud-based system 100. For example, the lightweight tunnel can be HTTP-based. With the application 350, there is no requirement for PAC files, an IPSec VPN, authentication cookies, or user 102 setup.

Example Server Architecture

FIG. 4 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chip-set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

FIG. 5 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IOT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 5 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

Zero Trust Network Access Using the Cloud-Based System

Figure 6:
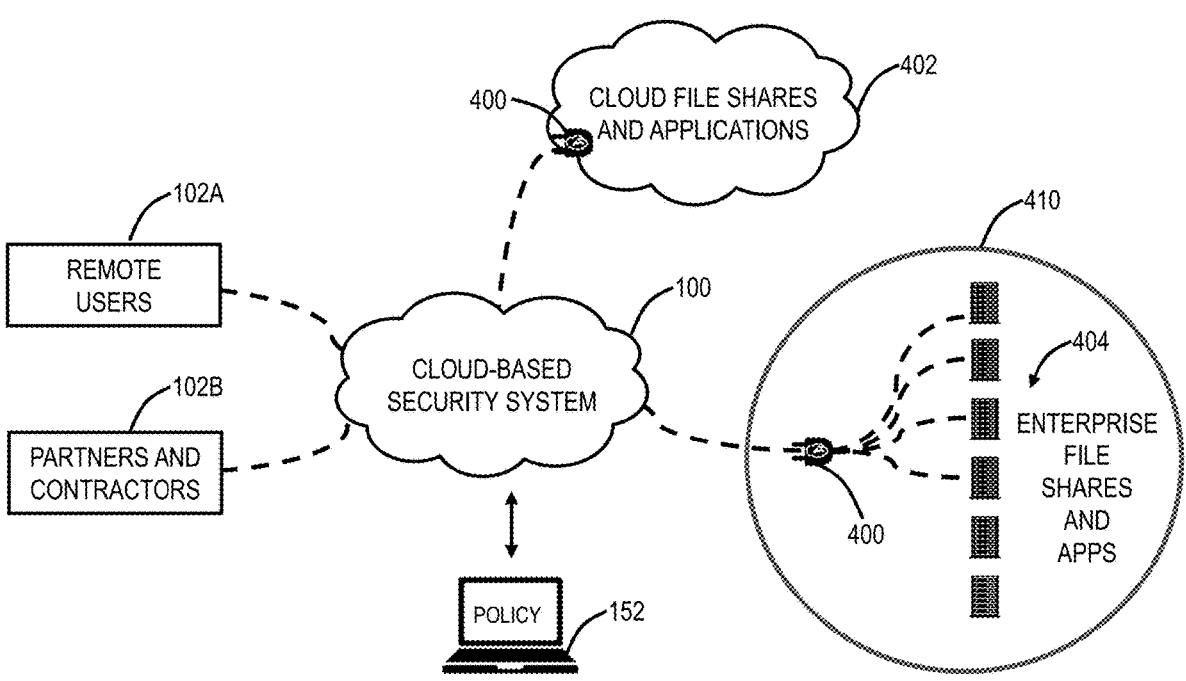
FIG. 6 is a network diagram of a Zero Trust Network Access (ZTNA) application utilizing the cloud-based system.

FIG. 6 is a network diagram of a Zero Trust Network Access (ZTNA) application utilizing the cloud-based system 100. For ZTNA, the cloud-based system 100 can dynamically create a connection through a secure tunnel between an endpoint (e.g., users 102A, 102B) that are remote and an on-premises connector 400 that is either located in cloud file shares and applications 402 and/or in an enterprise network 410 that includes enterprise file shares and applications 404. The connection between the cloud-based system 100 and on-premises connector 400 is dynamic, on-demand, and orchestrated by the cloud-based system 100. A key feature is its security at the edge—there is no need to punch any holes in the existing on-premises firewall. The connector 400 inside the enterprise (on-premises) "dials out" and connects to the cloud-based system 100 as if it too were an endpoint. This on-demand dial-out capability and tunneling authenticated traffic back to the enterprise is a key differentiator for ZTNA. Also, this functionality can be implemented in part by the application 350 on the user device 300. Also, the applications 402, 404 can include B2B applications. Note, the difference between the applications 402, 404 is the applications 402 are hosted in the cloud, whereas the applications 404 are hosted on the enterprise network 410. The B2B service described herein contemplates use with either or both of the applications 402, 404.

The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 402, 404 from the network, instead of providing access with a connector 400, in front of the applications 402, 404, an application on the user device 300, a central authority 152 to push policy, and the cloud-based system 100 to stitch the applications 402, 404 and the software connectors 400 together, on a per-user, per-application basis.

With the virtual private access, users can only see the specific applications 402, 404 allowed by the central authority 152. Everything else is "invisible" or "dark" to them. Because the virtual private access separates the application from the network, the physical location of the application 402, 404 becomes irrelevant-if applications 402, 404 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy because the virtual private access is a service offering to end-users and enterprises.

VPN Architecture

Figure 7:
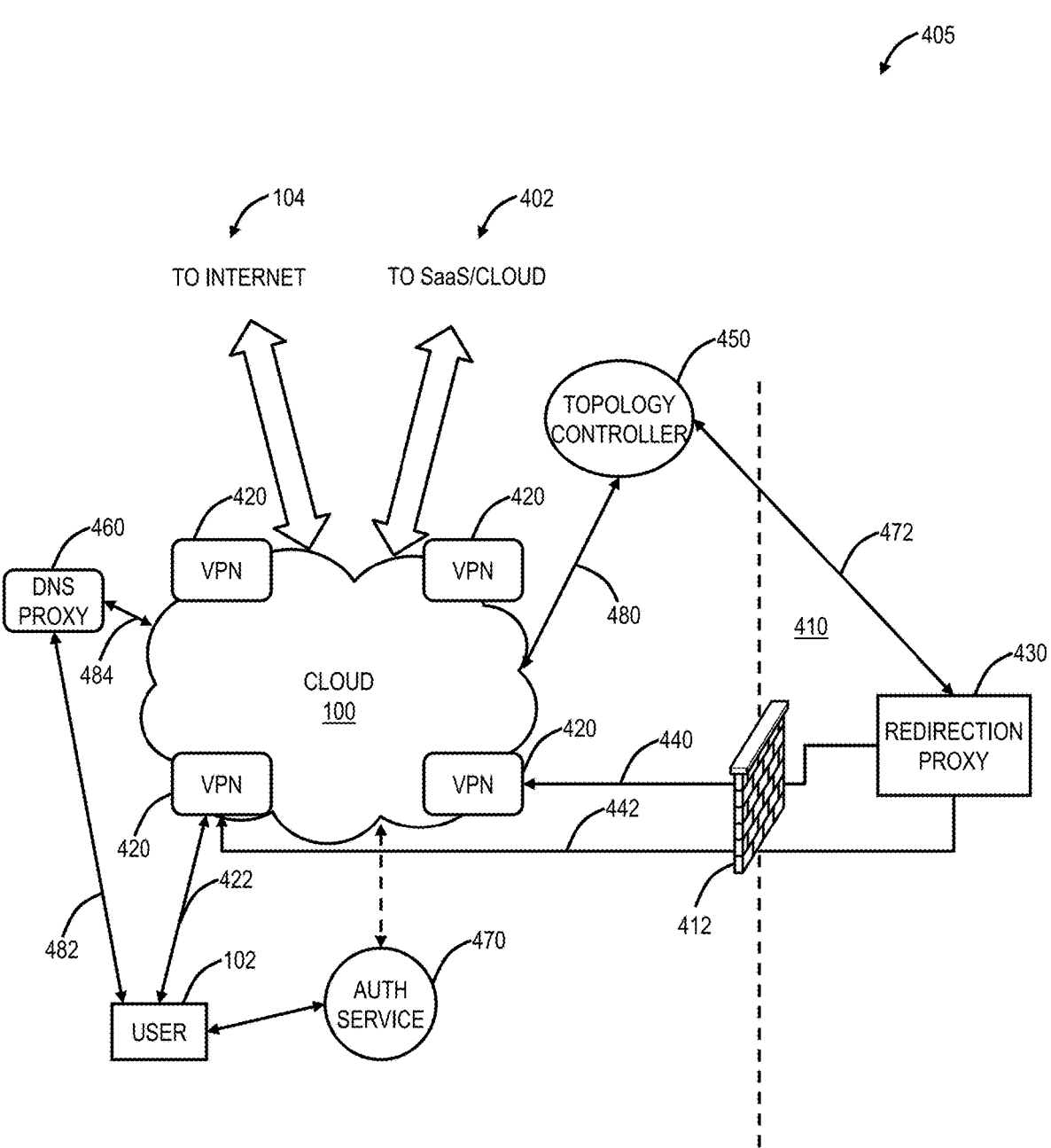
FIG. 7 is a network diagram of a VPN architecture for an intelligent, cloud-based global VPN.

FIG. 7 is a network diagram of a VPN architecture 405 for an intelligent, cloud-based global VPN. For illustration purposes, the VPN architecture 405 includes the cloud-based system 100, the Internet 104, the applications 402 in SaaS/public cloud systems, and the enterprise network 410. The VPN architecture 405 also includes a user 102, which can include any computing device/platform connecting to the cloud-based system 100, the Internet 104, the applications 402, and the enterprise network 410. The VPN architecture 405 includes a single user 102 for illustration purposes, but those of ordinary skill in the art will recognize that the VPN architecture 405 contemplates a plurality of users 102. The user 102 can be a nomadic user, a regional/branch office, etc. That is, the user 102 can be any user of the enterprise network 410 that is physically located outside a firewall 412 associated with the enterprise network 410. The SaaS/public cloud systems can include any systems containing computing and data assets in the cloud such as, for example, Microsoft OneDrive, Google Drive, Dropbox, Apple iCloud, Customer Relationship Management (CRM) systems, SCM, Sales management systems, etc. The enterprise network 410 includes local computing and data assets behind the firewall 412 for additional security on highly confidential assets or legacy assets not yet migrated to the cloud.

The user 102 needs to access the Internet 104, the SaaS/public cloud systems for the applications 402, and the enterprise network 410. Again, conventionally, the solution for secure communication, the user 102 has a VPN connection through the firewall 412 where all data is sent to the enterprise network 410, including data destined for the Internet 104 or the SaaS/public cloud systems for the applications 402. Furthermore, this VPN connection dials into the enterprise network 410. The systems and methods described herein provide the VPN architecture 405, which provides a secure connection to the enterprise network 410 without bringing all traffic, e.g., traffic for the Internet 104 or the SaaS/public cloud systems, into the enterprise network 410 as well as removing the requirement for the user 102 to dial into the enterprise network 410.

Instead of the user 102 creating a secure connection through the firewall 412, the user 102 connects securely to a VPN device 420 located in the cloud-based system 100 through a secure connection 422. Note, the cloud-based system 100 can include a plurality of VPN devices 420. The VPN architecture 405 dynamically routes traffic between the user 102 and the Internet 104, the SaaS/public cloud systems for the applications 402, and securely with the enterprise network 410. For secure access to the enterprise network 410, the VPN architecture 405 includes dynamically creating connections through secure tunnels between three entities: the VPN device 420, the cloud, and an on-premises redirection proxy 430. The connection between the cloud-based system 100 and the on-premises redirection proxy 430 is dynamic, on-demand and orchestrated by the cloud-based system 100. A key feature of the systems and methods is its security at the edge of the cloud-based system 100—there is no need to punch any holes in the existing on-premises firewall 412. The on-premises redirection proxy 430 inside the enterprise network 410 "dials out" and connects to the cloud-based system 100 as if it too were an end-point via secure connections 440, 442. This on-demand dial-out capability and tunneling authenticated traffic back to the enterprise network 410 is a key differentiator.

The VPN architecture 405 includes the VPN devices 420, the on-premises redirection proxy 430, a topology controller 450, and an intelligent DNS proxy 460. The VPN devices 420 can be Traffic (VPN) distribution servers and can be part of the cloud-based system 100. In an embodiment, the cloud-based system 100 can be a security cloud such as available from Zscaler, Inc. (www.zscaler.com) performing functions on behalf of every client that connects to it: a) allowing/denying access to specific Internet sites/apps-based on security policy and absence/presence of malware in those sites, and b) set policies on specific SaaS apps and allowing/denying access to specific employees or groups.

The on-premises redirection proxy 430 is located inside a perimeter of the enterprise network 410 (inside the private cloud or inside the corporate data center-depending on the deployment topology). It is connected to a local network and acts as a "bridge" between the users 102 outside the perimeter and apps that are inside the perimeter through the secure connections 440, 442. But, this "bridge" is always closed—it is only open to the users 102 that pass two criteria: a) they must be authenticated by an enterprise authentication service 470, and b) the security policy in effect allows them access to "cross the bridge."

When the on-premises redirection proxy 430 starts, it establishes a persistent, long-lived connection 472 to the topology controller 450. The topology controller 450 connects to the on-premises redirection proxy 430 through a secure connection 472 and to the cloud-based system 100 through a secure connection 480. The on-premises redirection proxy 430 waits for instruction from the topology controller 450 to establish tunnels to specific VPN termination nodes, i.e., the VPN devices 420, in the cloud-based system 100. The on-premises redirection proxy 430 is most expediently realized as custom software running inside a virtual machine (VM). The topology controller 450, as part of the non-volatile data for each enterprise, stores the network topology of a private network of the enterprise network 410, including, but not limited to, the internal domain name(s), subnet(s) and other routing information.

The DNS proxy 460 handles all domain names to Internet Protocol (IP) Address resolution on behalf of endpoints (clients). These endpoints are user computing devices —such as mobile devices, laptops, tablets, etc. The DNS proxy 460 consults the topology controller 450 to discern packets that must be sent to the Internet 104, the SaaS/public cloud systems, vs. the enterprise network 410 private network. This decision is made by consulting the topology controller 450 for information about a company's private network and domains. The DNS proxy 460 is connected to the user 102 through a connection 482 and to the cloud-based system 100 through a connection 484.

The VPN device 420 is located in the cloud-based system 100 and can have multiple points-of-presence around the world. If the cloud-based system 100 is a distributed security cloud, the VPN device 420 can be located with enforcement nodes 150. In general, the VPN device 420 can be implemented as software instances on the enforcement nodes 150, as a separate virtual machine on the same physical hardware as the enforcement nodes 150, or a separate hardware device such as the server 200, but part of the cloud-based system 100. The VPN device 420 is the first point of entry for any client wishing to connect to the Internet 104, SaaS apps, or the enterprise private network. In addition to doing traditional functions of a VPN server, the VPN device 420 works in concert with the topology controller 450 to establish on-demand routes to the on-premises redirection proxy 430. These routes are set up for each user on demand. When the VPN device 420 determines that a packet from the user 102 is destined for the enterprise private network, it encapsulates the packet and sends it via a tunnel between the VPN device 420 and the on-premises redirection proxy 430. For packets meant for the Internet 104 or SaaS clouds, the VPN device 420 can forwards it to the enforcement nodes 150—to continue processing as before or send directly to the Internet 104 or SaaS clouds.

VPN Process

FIG. 8 is a flowchart of a VPN process 500 for an intelligent, cloud-based global VPN. The VPN process 500 can be implemented through the VPN architecture 405. The VPN process 500 includes the user 102 connecting to the cloud-based system 100 through authentication (step 510). Once the authentication is complete, a VPN is established between the user 102 and a VPN server in the cloud-based system 100 and DNS for the user 102 is set to a DNS proxy 460 (step 520). Now, the user 102 has a secure VPN connection to the cloud-based system 100. Subsequently, the user 102 sends a request to the cloud-based system 100 via the DNS proxy 460 (step 530). Here, the request can be anything-request for the enterprise network 410, the Internet 104, the applications 402 in the SaaS/public cloud systems, the applications 404 in the enterprise network 410, etc. The DNS proxy 460 contacts the topology controller 450 with the identity of the user and the request (step 540). That is, whenever the user 102 wishes to reach a destination (Internet, Intranet, SaaS, etc.), it will consult the DNS proxy 460 to obtain the address of the destination.

For non-enterprise requests, the cloud-based system 100 forwards the request per policy (step 550). Here, the cloud-based system 100 can forward the request based on the policy associated with the enterprise network 410 and the user 102. With the identity of the user and the enterprise they belong to, the VPN server will contact the topology controller 450 and pre-fetch the enterprise private topology. For enterprise requests, the topology controller 450 fetches a private topology of the enterprise network 410, instructs the redirection proxy 430 to establish an outbound tunnel to the VPN server, the redirection proxy 430 establishes the outbound tunnel, and requests are forward between the user 102 and the enterprise network 410 securely (step 560). Here, the DNS proxy 460 works with the topology controller 450 to determine the local access in the enterprise network 410, and the topology controller 450 works with the redirection proxy 430 to dial out a secure connection to the VPN server. The redirection proxy 430 establishes an on-demand tunnel to the specific VPN server so that it can receive packets meant for its internal network.

Global VPN Applications

Advantageously, the systems and methods avoid the conventional requirement of VPN tunneling all data into the enterprise network 410 and hair-pinning non-enterprise data back out. The systems and methods also allow the enterprise network 410 to have remote offices, etc. without requiring large hardware infrastructures—the cloud-based system 100 bridges the users 102, remote offices, etc. to the enterprise network 410 in a seamless manner while removing the requirement to bring non-enterprise data through the enterprise network 410. This recognizes the shift to mobility in enterprise applications. Also, the VPN tunnel on the user 102 can leverage and use existing VPN clients available on the user devices 300. The cloud-based system 100, through the VPN architecture 405, determines how to route traffic for the user 102 efficiently-only enterprise traffic is routed securely to the enterprise network 410. Additionally, the VPN architecture 405 removes the conventional requirement of tunneling into the enterprise network 410, which can be an opportunity for security vulnerabilities. Instead, the redirection proxy 430 dials out of the enterprise network 410.

The systems and methods provide, to the user (enterprise user), a single, seamless way to connect to Public and Private clouds—with no special steps needed to access one vs. the other. To the IT Admin, the systems and methods provide a single point of control and access for all users— security policies and rules are enforced at a single global cloud chokepoint—without impacting user convenience/ performance or weakening security.

Virtual Private Access Via the Cloud

Figure 9:
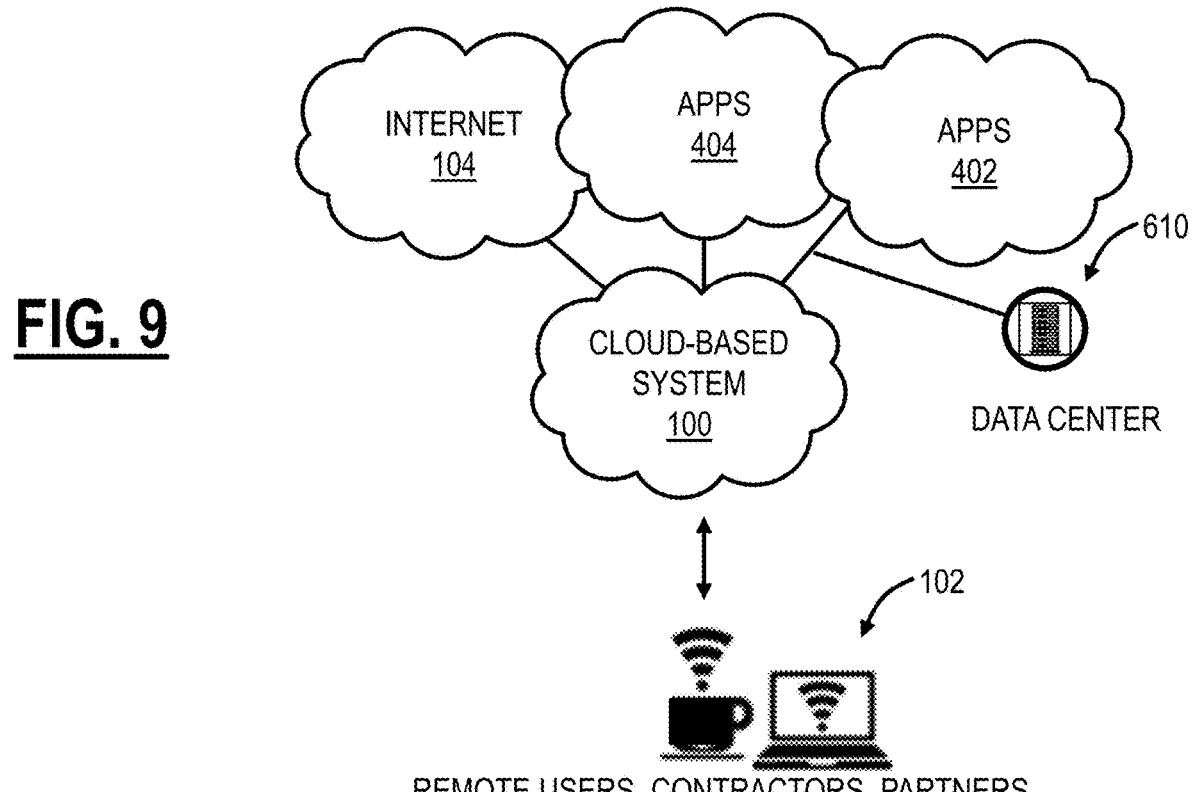
FIG. 9 is a network diagram illustrating the cloud-based system with private applications and data centers connected thereto to provide virtual private access through the cloud-based system.

FIG. 9 is a network diagram illustrating the cloud-based system 100 with private applications 402, 404 and data centers 610 connected thereto to provide virtual private access through the cloud-based system 100. In an aspect, the virtual private access described herein leverages the cloud-based system 100 to enable various users 102 including remote users, contractors, partners, business customers, etc., i.e., anyone who needs access to the private applications 402, 404 and the data centers 610 access, without granting unfettered access to the internal network, without requiring hardware or appliances, and in a seamless manner from the users' 102 perspective. The private applications 402, 404 include applications dealing with financial data, personal data, medical data, intellectual property, records, etc., that is the private applications 404 can be available on the enterprise network 410, but not available remotely except conventionally via VPN access. Examples of the private applications 402, 404 can include Customer Relationship Management (CRM), sales automation, financial applications, time management, document management, etc. Also, the applications 402, 404 can be B2B applications or services as described herein.

The virtual private access is a new technique for the users 102 to access the file shares and applications 402, 404, without the cost, hassle or security risk of VPNs, which extend network access to deliver app access. The virtual private access decouples private internal applications from the physical network to enable authorized user access to the file shares and applications 402, 404, without the security risk or complexity of VPNs. That is, virtual private access takes the "Network" out of VPNs.

In the virtual private access, the users 102, the file shares and applications 402, 404, are communicatively coupled to the cloud-based system 100, such as via the Internet 104 or the like. On the client-side, at the users 102, the applications 402, 404 provision both secure remote access and optionally accessibility to the cloud-based system 100. The application 402, 404 establishes a connection to the closest enforcement node 150 in the cloud-based system 100 at startup and may not accept incoming requests.

At the file shares and applications 402, 404, the lightweight connectors 400 sit in front of the applications 402, 404. The lightweight connectors 400 become the path to the file shares and applications 402, 404 behind it, and connect only to the cloud-based system 100. The lightweight connectors 400 can be lightweight, ephemeral binary, such as deployed as a virtual machine, to establish a connection between the file shares and applications 402, 404 and the cloud-based system 100, such as via the closest enforcement node 150. The lightweight connectors 400 do not accept inbound connections of any kind, dramatically reducing the overall threat surface. The lightweight connectors 400 can be enabled on a standard VMware platform; additional lightweight connectors 400 can be created in less than 5 seconds to handle additional application instances. By not accepting inbound connections, the lightweight connectors 400 make the file shares and applications 402, 404 "dark," removing a significant threat vector.

The policy can be established and pushed by policy engines in the central authority 152, such as via a distributed cluster of multi-tenant policy engines that provide a single interface for all policy creation. Also, no data of any kind transits the policy engines. The enforcement nodes 150 in the security cloud stitch connections together, between the users 102 and the file shares and applications 402, 404, without processing traffic of any kind. When the user 102 requests an application in the file shares and applications 402, 404, the policy engine delivers connection information to the application 350 and app-side enforcement nodes 150, which includes the location of a single enforcement nodes 150 to provision the client/app connection. The connection is established through the enforcement nodes 150, and is encrypted with a combination of the customer's client and server-side certificates. While the enforcement nodes 150 provision the connection, they do not participate in the key exchange, nor do they have visibility into the traffic flows.

Advantageously, the virtual private access provides increased security in that the file shares and applications 402, 404 are visible only to the users 102 that are authorized to access them; unauthorized users are not able to even see them. Because application access is provisioned through the cloud-based system 100, rather than via a network connection, the virtual private access makes it impossible to route back to applications. The virtual private access is enabled using the application 350, without the need to launch or exit VPN clients. The application access just works in the background enabling application-specific access to individual contractors, business partners or other companies, i.e., the users 102.

The virtual private access provides capital expense (CAPEX) and operating expense (OPEX) reductions as there is no hardware to deploy, configure, or maintain. Legacy VPNs can be phased out. Internal IT can be devoted to enabling business strategy, rather than maintaining network "plumbing." Enterprises can move apps to the cloud on their schedule, without the need to re-architect, set up site-to-site VPNs or deliver a substandard user experience.

The virtual private access provides easy deployment, i.e., put lightweight connectors 400 in front of the file shares and applications 402, 404, wherever they are. The virtual private access will automatically route to the location that delivers the best performance. Wildcard app deployment will discover applications upon request, regardless of their location, then build granular user access policies around them. There is no need for complex firewall rules, Network Address Translation issues or policy juggling to deliver application access. Further, the virtual private access provides seamless integration with existing Single Sign-On (SSO) infrastructure.

Figure 10:
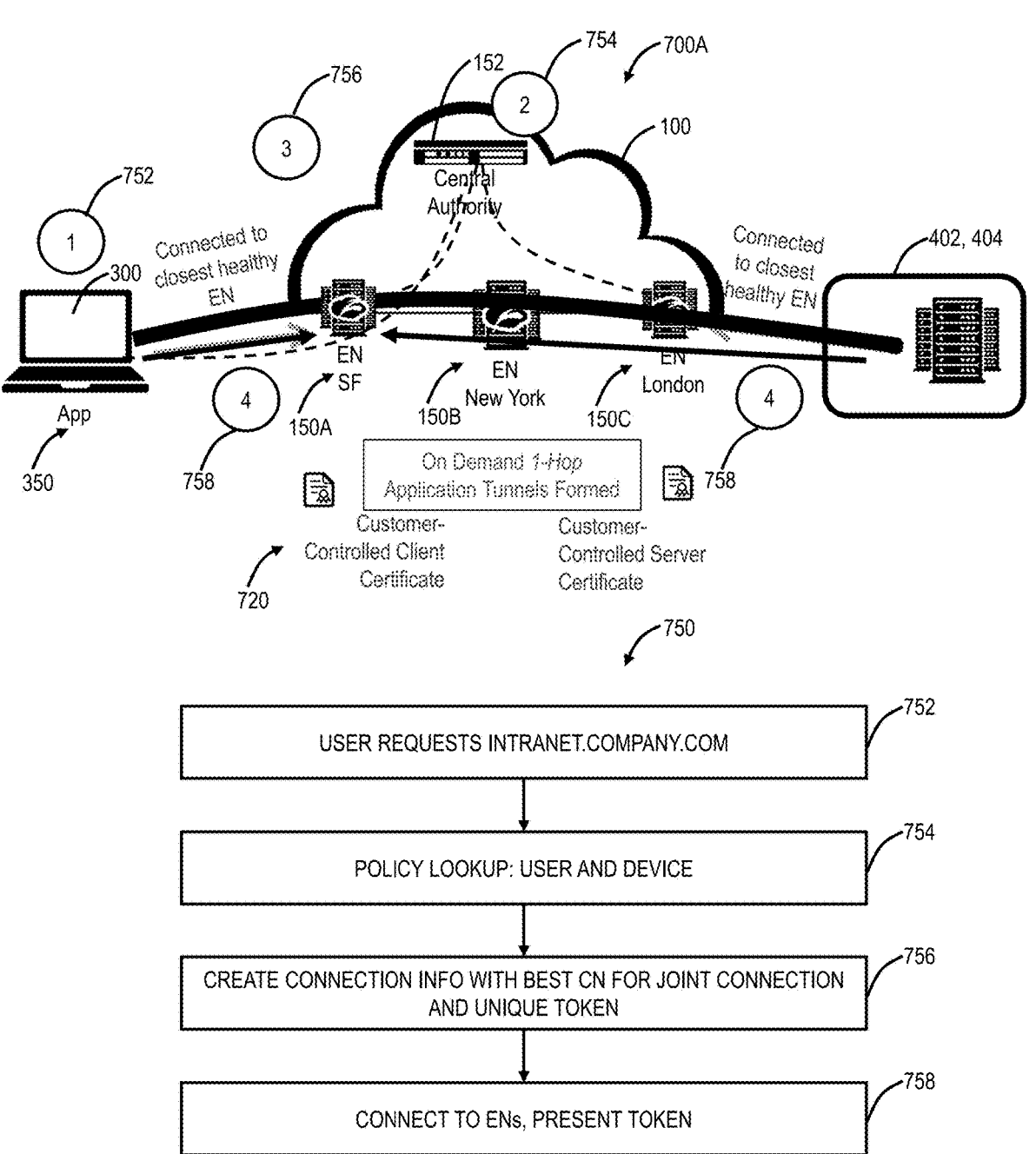
FIG. 10 is a network diagram of a virtual private access network and a flowchart of a virtual private access process implemented thereon.

FIG. 10 is a network diagram of a virtual private access network 700A and a flowchart of a virtual private access process 750 implemented thereon. The cloud-based system 100 includes three enforcement nodes 150A, 150B, 150C, assume for illustration purposes in San Francisco, New York, and London, respectively. The user 102 has the application 350 executing on the user device 300, which is communicatively coupled to the enforcement node 150A. The enterprise file share and application 402, 404 is communicatively coupled to the enforcement node 150C. Note, there can be direct connectivity between the enforcement nodes 150A, 150C, the enforcement nodes 150A, 150C can connect through the enforcement node 150B, or both the user 102 and the enterprise file share and application 402, 404 can be connected to the same node 150. That is, the architecture of the cloud-based system 100 can include various implementations.

The virtual private access process 750 is described with reference to both the user 102, the cloud-based system 100, and the enterprise file share and application 402, 404. First, the user 102 is executing the application 350 on the user device 300, in the background. The user 102 launches the application 350 and can be redirected to an enterprise ID provider or the like to sign on, i.e., a single sign on, without setting up new accounts. Once authenticated, Public Key Infrastructure (PKI) certificate 720 enrollment occurs, between the user 102 and the enforcement node 150A. With the application 350 executing on the user device, the user 102 makes a request to the enterprise file share and application 402, 404, e.g., intranet.company.com, crm.company-.com, etc. (step 752). Note, the request is not limited to web applications and can include anything such as a remote desktop or anything handling any static Transmission Control Protocol (TCP) or User Datagram Protocol (UDP) applications.

This request is intercepted by the enforcement node 150A and redirected to the central authority 152, which performs a policy lookup for the user 102 and the user device 300

(step 754), transparent to the user 102. The central authority 152 determines if the user 102 and the user device 300 are authorized for the enterprise file share and application 402, 404. Once authorization is determined, the central authority 152 provides information to the enforcement nodes 150A, 150B, 150C, the application 350, and the lightweight connectors 400 at the enterprise file share and application 402, 404, and the information can include the certificates 720 and other details necessary to stitch secure connections between the various devices. Specifically, the central authority 152 can create connection information with the best enforcement nodes 150 for joint connections, from the user 102 to the enterprise file share and application 402, 404, and the unique tokens (step 756). With the connection information, the enforcement node 150A connects to the user 102, presenting a token, and the enforcement node 150C connects to the lightweight connector 400, presenting a token (step 758). Now, a connection is stitched between the user 102 to the enterprise file share and application 402, 404, through the application 350, the enforcement nodes 150A, 150B, 150C, and the lightweight connector 400.

Comparison—VPN with Virtual Private Access

Figure 11:
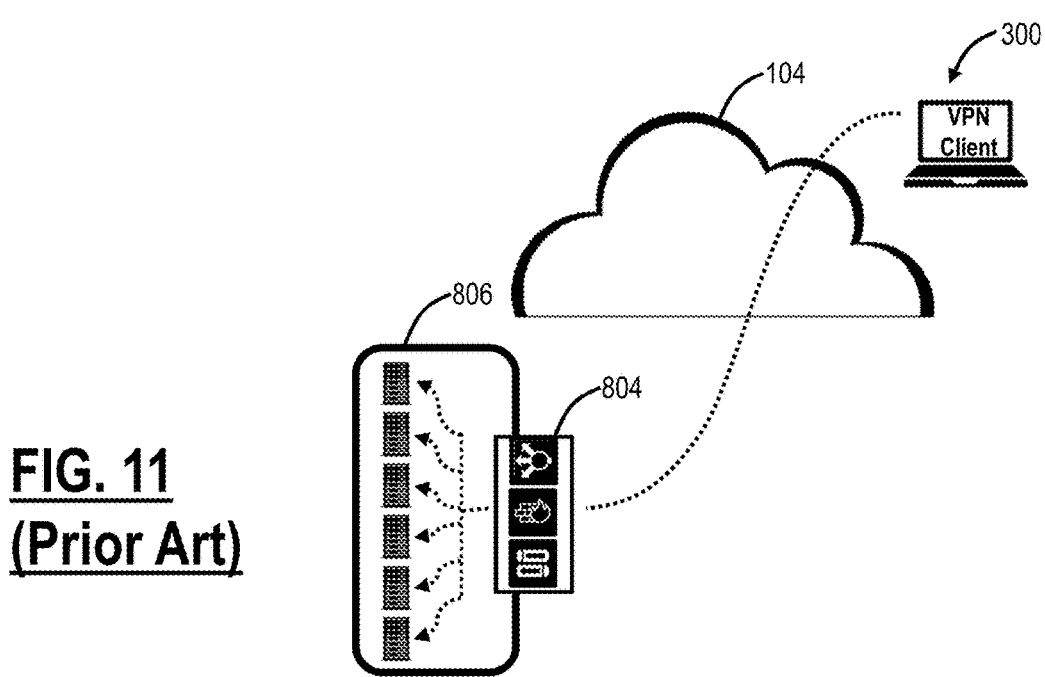
FIGS. 11 and 12 are network diagrams of a VPN configuration (FIG. 11) compared to virtual private access (FIG. 12) illustrating the differences therein.
Figure 12:
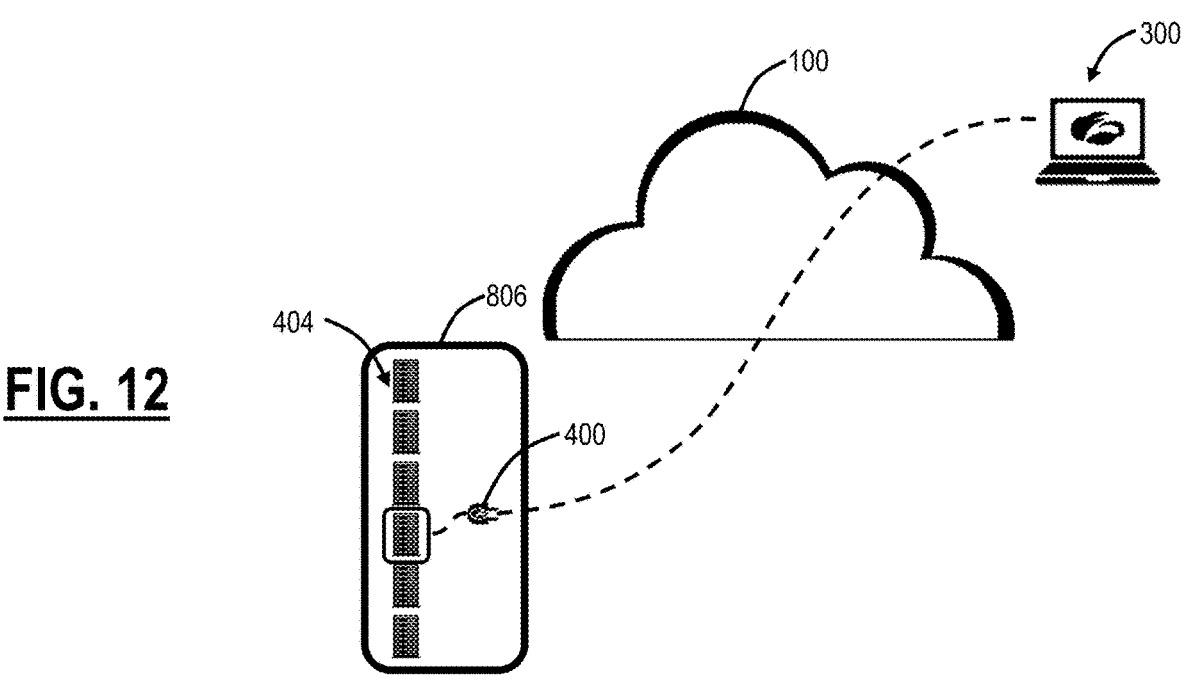

FIGS. 11 and 12 are network diagrams of a VPN configuration (FIG. 11) compared to virtual private access (FIG. 12) illustrating the differences therein. In FIG. 11, a user device 300 connects to a VPN termination device 804 associated with an enterprise network 806 via the Internet 104, such that the user device 300 is on the enterprise network 806, where associated applications reside. Of course, any malware on the user device 300 or anyone that steals the user device 300 is also on the enterprise network 806. The VPN termination device 804 creates a Distributed Denial-of-Service (DDOS) attack surface, adds infrastructure cost and creates network complexity as applications grow. Conversely, in FIG. 12, the user device 300 uses the virtual private access via the cloud-based system 100 to connect to the lightweight connector 400 associated with a specific application 404. The virtual private access provides granular access by the user device 300 and the application, and the user device 300 is not on the enterprise network 806. Thus, the application is never directly exposed to the user device 300, the security cloud handles provisioning, and the traffic remains completely private.

Comparison—Private Applications in the Public Cloud

FIGS. 13 and 14 are network diagrams of conventional private application access in the public cloud (FIG. 13) compared to private application in the public cloud with virtual private access (FIG. 14). In FIG. 13, the user device 300 still has to connect to the enterprise network 806 via the VPN termination device 804 as in FIG. 11, and the cloud applications, such as in the data center 610, are accessible via the enterprise network 806 via a site-to-site VPN between the enterprise network 806 and the data center 610. Disadvantageously, the user experience is eroded for the user device 300 and agility is hampered for the enterprise by networking concerns and capability. In FIG. 14, the virtual private access abstracts the application 402, in the data center 610, from the IP address, so location is irrelevant. The enterprise can move private applications to the cloud securely, as needed.

Comparison—Contractor/Private Application Access

FIGS. 15 and 16 are network diagrams of conventional contractor/partner access (FIG. 15) of applications in the enterprise network 806 compared to contractor/partner access (FIG. 16) of the applications with virtual private access. Contractor/partner access includes providing third parties access to applications on the enterprise network 806, for a variety of purposes. In FIG. 15, similar to FIGS. 11 and 13, contractor/partner access includes VPN connections to the VPN termination device 804, providing contractor/partners 820 full access to the enterprise network 806, not just the specific application or asset that they require. Unfortunately, stolen credentials can allow hackers to get into networks or to map assets for later assault. In FIG. 16, the virtual private access, using the cloud-based system 100, allows access specific to applications or assets as needed by the contractor/partners 820, via the lightweight connector 400. Thus, the contractor/partners 820 do not have full network access, the access is specific to each user, and the connections are provisioned dynamically, avoiding a direct network connection that can be misused or exploited.

Comparison—Example Application—M&A Data Access

FIGS. 17 and 18 are network diagrams of a conventional network setup to share data between two companies (FIG. 17) such as for Merger and Acquisition (M&A) purposes or the like, compared to a network setup using virtual private access (FIG. 18). Conventionally, the two companies provide VPN connections between their associated enterprise networks 806A, 806B to one another. Each company gets "all or nothing"-no per-application granularity. Disadvantageously, creating Access Control Lists (ACLs)/firewall rules and NATting through each companies' respective firewalls is very complex, particularly with overlapping internal IP addressing. In FIG. 18, the virtual private access allows connections provisioned by the user and device to the application by name, not by IP address, authorized users can access only specific applications, not an entire network, and firewall complexities disappear.

Administrative View of Virtual Private Access

FIGS. 19 and 20 are screenshots of Graphical User Interfaces (GUIs) for administrator access to the virtual private access. FIG. 19 illustrates a GUI of network auto-discovery and FIG. 20 illustrates a GUI for reporting. For network and application discovery, the virtual private access can use wildcard application discovery where a Domain/name-based query to the lightweight connector 400 will show company applications behind them. This allows the discovery of internal applications as users request them using "*.company.com" to find applications. Then, the granular policy can be built around the applications to dramatically simply startup. Further, the virtual private access can show the location of users that are accessing private/internal applications, including identifying anomalous access patterns to assist in stopping possible data leakage or compliance violation.

Virtual Private Access

In an embodiment, a virtual private access method implemented by a cloud-based system, includes receiving a request to access resources from a user device, wherein the resources are located in one of a public cloud and an enterprise network and the user device is remote therefrom on the Internet; forwarding the request to a central authority for a policy look up and for a determination of connection information to make an associated secure connection through the cloud-based system to the resources; receiving the connection information from the central authority responsive to an authorized policy look up; and creating secure tunnels between the user device and the resources based on the connection information. Prior to the receiving, a user executes an application on the user device, provides authentication, and provides the request with the application operating on the user device. The application can be configured to connect the user device to the cloud-based system, via an optimized cloud node based on a location of the user device. The resources can be communicatively coupled to a lightweight connector operating on a computer and communicatively coupled between the resources and the cloud-based system. The virtual private access method can further include detecting the resources based on a query to the lightweight connector. The lightweight connector can be prevented from accepting inbound connections, thereby preventing access of the resources external from the public cloud or the enterprise network. The creating secure tunnels can include creating connections between one or more cloud nodes in the cloud-based system, wherein the one or more cloud nodes do not participate in a key exchange, and the one or more cloud nodes do not have data access to traffic on the secure tunnels. The creating secure tunnels can include creating connections between one or more cloud nodes in the cloud-based system, wherein the one or more cloud nodes create the secure tunnels based on a combination of a client-side certificate and a server-side certificate. The secure tunnels can be created through software on the user device, the cloud-based system, and a lightweight connector operating on a computer associated with the resources, thereby eliminating dedicated hardware for virtual private network connections.

In another embodiment, a cloud-based system adapted to implement virtual private access includes one or more cloud nodes communicatively coupled to one another; wherein each of the one or more cloud nodes includes one or more processors and memory storing instructions that, when executed, cause the one or more processors to receive a request to access resources from a user device, wherein the resources are located in one of a public cloud and an enterprise network and the user device is remote therefrom on the Internet; forward the request to a central authority for a policy look up and for a determination of connection information to make an associated secure connection through the cloud-based system to the resources; receive the connection information from the central authority responsive to an authorized policy look up; and create secure tunnels between the user device and the resources based on the connection information. Prior to reception of the request, a user executes an application on the user device, provides authentication, and provides the request with the application operating on the user device. The application can be configured to connect the user device to the cloud-based system, via an optimized cloud node based on a location of the user device. The resources can be communicatively coupled to a lightweight connector operating on a computer and communicatively coupled between the resources and the cloud-based system. The memory storing instructions that, when executed, can further cause the one or more processors to detect the resources based on a query to the lightweight connector. The lightweight connector can be prevented from accepting inbound connections, thereby preventing access of the resources external from the public cloud or the enterprise network. The secure tunnels can be created through connections between one or more cloud nodes in the cloud-based system, wherein the one or more cloud nodes do not participate in a key exchange, and the one or more cloud nodes do not have data access to traffic on the secure tunnels. The secure tunnels can be created through connections between one or more cloud nodes in the cloud-based system, wherein the one or more cloud nodes create the secure tunnels based on a combination of a client-side certificate and a server-side certificate. The secure tunnels can be created through software on the user device, the cloud-based system, and a lightweight connector operating on a computer associated with the resources, thereby eliminating dedicated hardware for virtual private network connections.

Software stored in a non-transitory computer readable medium including instructions executable by a system, which in response to such execution causes the system to perform operations including receiving a request to access resources from a user device, wherein the resources are located in one of a public cloud and an enterprise network and the user device is remote therefrom on the Internet; forwarding the request to a central authority for a policy look up and for a determination of connection information to make an associated secure connection through the cloud-based system to the resources; receiving the connection information from the central authority responsive to an authorized policy look up; and creating secure tunnels between the user device and the resources based on the connection information. The resources can be communicatively coupled to a lightweight connector operating on a computer and communicatively coupled between the resources and the cloud-based system, and wherein the instructions executable by the system, which in response to such execution can further cause the system to perform operations including detecting the resources based on a query to the lightweight connector.

VPN in the Cloud

In an embodiment, a method includes connecting to a client at a Virtual Private Network (VPN) device in a cloud-based system; forwarding requests from the client for the Internet or public clouds accordingly; and for requests for an enterprise associated with the client, contacting a topology controller to fetch a topology of the enterprise, causing a tunnel to be established from the enterprise to the VPN device, and forwarding the requests for the enterprise through the tunnel to the cloud-based system for proactive monitoring; and providing a secure connection from the cloud-based system back to the enterprise, including internal domain and subnets associated with the enterprise. The method can further include authenticating, via an authentication server, the client prior to the connecting and associated the client with the enterprise. The method can further include, subsequent to the connecting, setting a Domain Name Server (DNS) associated with the cloud-based system to provide DNS lookups for the client. The method can further include utilizing the DNS to determine a destination of the requests; and, for the requests for the enterprise, contacting the topology controller to pre-fetch the topology of the enterprise. The method can further include operating an on-premises redirection proxy within the enterprise, wherein the on-premises redirection proxy is configured to establish the tunnel from the enterprise to the VPN device. Secure tunnels to the enterprise are dialed out from the enterprise by the on-premises redirection proxy. The on-premises redirection proxy is a virtual machine operating behind a firewall associated with the enterprise. The on-premises redirection proxy is configured as a bridge between the client and applications inside the enterprise. The VPN device operates on a cloud node in the cloud-based system, and wherein the cloud-based system includes a distributed security cloud. The VPN device can include one of a software instance on a cloud node or a virtual machine on the cloud node. The topology controller includes a network topology of the enterprise, including internal domain names and subnets.

In another embodiment, a cloud-based system includes one or more Virtual Private Network (VPN) servers, wherein one or more clients connect securely to the one or more VPN servers; a topology controller communicatively coupled to the one or more VPN servers; a Domain Name Server (DNS) communicatively coupled to the topology controller and the one or more VPN servers; and a redirection proxy located in a private network and communicatively coupled to the one or more VPN servers and the topology controller; wherein requests from the one or more clients to the private network cause on demand secure connections being established by the redirection proxy to associated VPN servers in a cloud-based system, wherein the on demand secure connections provide connectivity to the private network including internal domain and subnets associated with the private network, and wherein the cloud-based system performs proactive monitoring. Requests from the one or more clients outside of the private network are forwarded without traversing the private network. The redirection proxy maintains a persistent connection to the topology controller and establishes secure tunnels to the one or more VPN servers based on direction from the topology controller. The topology controller includes a network topology of the private network, including internal domain names and subnets. The VPN servers operate on cloud nodes in a distributed security cloud.

In yet another embodiment, a VPN system includes a network interface, a data store, and a processor, each communicatively coupled together; and memory storing instructions that, when executed, cause the processor to establish a secure tunnel with a client; forward requests from the client to the Internet accordingly; and for requests to an enterprise, contact a topology controller to fetch a topology of the enterprise, cause a tunnel to be established from the enterprise to the VPN system, and forwarding the requests for the enterprise through the tunnel and the secure tunnel, wherein the secure tunnel is achieved by using an on-demand dial-out and tunneling traffic authentication. The memory storing instructions that, when executed, further cause the processor to cause the tunnel to be established from the enterprise to the VPN system through an on premises redirection proxy located within the enterprise.

Browser Isolation

Browser (web) isolation is a technique where a user's browser or apps are physically isolated away from the user device, the local network, etc. thereby removing the risks of malicious code, malware, cyberattacks, etc. This has been shown to be an effective technique for enterprises to reduce attacks. Techniques for browser isolation are described in commonly-assigned U.S. patent application Ser. No. 16/702,889, filed Dec. 4, 2019, and entitled "Cloud-based web content processing system providing client threat isolation and data integrity," the contents of which are incorporated by reference herein. Traditionally browser isolation was focused on removing the risks of malicious code, malware, cyberattacks, etc. U.S. patent application Ser. No. 16/702,889 describes an additional use case of preventing data exfiltration. That is, because no data is delivered to the local system (e.g., to be processed by web content through the local web browser), none of the confidential or otherwise sensitive data can be retained on the local system.

The secure access can interoperate with browser isolation through the cloud-based system 100, to prevent data exfiltration, which is extremely critical as this is customer-facing data which adds to the sensitivity and liability, and also accessible to external users (customers). This functionality forces customers to interact with the B2B applications via an isolated, contained environment.

Private Service Edge in a Cloud-Based System

FIG. 21 is a network diagram of the cloud-based system 100 with a private service edge node 150P in the enterprise network 410. The private service edge node 150P is similar to the enforcement nodes 150 (i.e., public service edge nodes) except located in the enterprise network 410. For private application access, the service edge node 150P can be a broker that is hosted by the enterprise, but managed with the cloud-based system 100. As described herein, a broker is configured to create the tunnels between the user device 300 and the connector 400, and the broker is an intermediate device. The service edge node 150P is designed as a single-tenant (per customer) instance, is configured to operate with the cloud-based system 100 including downloading policies and configuration, is configured to broker connections between the connector application 350 and the connector 400, is configured to enforce policies and cache path selection decisions, etc.

When a user 102 with the user device 300 is located on the enterprise network 410, the traffic between the user 102 and the applications 404 stay on the enterprise network 410 and consistent policies are applied for on-premise and remote. The private service edge node 150P can be located in a branch office, in a central office with tunnels to branch offices, etc. Of note, the private service edge node 150P is located with the applications 404 and the connector 400 and this proximity reduces latency.

The private service edge node 150P can be hosted in a public cloud, on-site as a Virtual Machine (VM), in a container, on physical servers, etc. The private service edge node 150P is publicly accessible such as via an IP address; the connector 400 is not publicly accessible—it dials out. The private service edge node 150P can include listen IP addresses and publish IP addresses or domains. The listen IP addresses are a set of IP addresses that the private service edge node 150P uses for accepting incoming connections, and this can be specified or all IP addresses. The publish IP addresses or domains, if specified, are required for connection to the private service edge node 150P. If these are specified, one of the entries is provided to the applications 350, e.g., randomly selected.

Private Access

FIG. 22 is a network diagram illustrating the cloud-based system 100 with private applications 402, 404 and data centers 610 connected thereto to provide virtual private access through the cloud-based system 100 along with different types of users 102, namely trusted and untrusted users. The ZTNA approach described herein provides virtual private access connecting authenticated users 102 to the applications 402, 404 after authorization and providing strong connection integrity with end-to-end encryption. However, tenants (organizations) do not implicitly trust the end user 102 or end user devices 300.

The following table illustrates example user 102 and user device 300 scenarios.

| User | Device | Trusted User | Trusted Device | Connection |
|---|---|---|---|---|
| Employee | Personal tablet | Y | N | Trusted user. Untrusted device. |
| Employee - on a notice period | Corporate laptop | N | Y | Untrusted user. Trusted device. |
| Third Party Contractors | Corporate laptop | N | Y | Third-party user. Trusted device. |
| Third Party Contractors | Non-corporate laptop | N | N | Third-party user. Untrusted device. |

With private application access, only an authenticated user can access the applications 402, 404; unauthenticated users see that the applications 402, 404 do not exist. However, an authenticated user can be an untrusted user or on an untrusted device. The security concerns with an untrusted user include access to sensitive information by query manipulation via web form; performing function elevation by URL manipulation; gaining access to internal resources via web server; etc. For example, an untrusted user can guess passwords of various accounts successfully, such as default/empty username and passwords (password spraying), stolen credentials for internal apps (credential stuffing), test default service accounts credentials, scripted login attempts (BOT), etc.

The security concerns with an untrusted device include the user's browser executes scripts and sends the user's cookie to the attacker's server, e.g., XSS, Cookie stealing; can cause Denial of Service (DOS) on target application (not DDOS), e.g., user's browser initiates large number of connection requests to target application, scripted traffic overwhelms applications (BOT); and can copy of sensitive data on a non-corporate device.

CISA Recommendations for OT Systems to Mitigate Ransomware Threats

The Cybersecurity and Infrastructure Security Agency (CISA) recommendations for OT systems include:

Update software, including operating systems, applications, and firmware, on IT network assets, in a timely manner.

Implement application allow listing.

Ensure user and process accounts are limited through account use policies, user account control, and privileged account management.

Require multi-factor authentication for access to OT and IT networks.

Enable strong spam filters to prevent phishing emails from reaching end users.

Implement and ensure robust network segmentation between IT and OT networks.

Implement a continuous and vigilant system monitoring program.

Also, NIST has promoted an Industry 4.0 vision of fully-integrated, collaborative manufacturing systems that respond in real time to meet changing demands and conditions in the factory, in the supply network, and in customer needs.

With 5G and the proliferation of OT/IOT/IIOT/ICS devices, there is a need to secure such devices beyond the conventional perimeter approach.

Privileged Remote Access for OT/IOT/IIOT/ICS Infrastructure

FIG. 23 is a network diagram of the cloud-based system 100 providing privileged remote access for OT/IOT/IIOT/ICS infrastructure. As described herein, the devices 300 can include any of OT, IOT, IIOT, ICS, etc. type devices. In this example, for illustration purposes, there are three locations 900-1, 900-2, 900-3, including an industry 4.0 location 900-1, an IIOT gateway location 900-2, and a factory floor location 900-3. Those skilled in the art will recognize other locations are contemplated, as well as those in FIG. 1A. In addition, remote operators 902 and third parties 904 are shown having access to the various OT, IOT, IIOT, ICS, etc. type devices 300. Here, the remote operators 902 can include a user device 300 with the application 350 (client connector) for access to the cloud-based system 100 to access the various OT, IOT, IIOT, ICS, etc. type devices 300. The third parties 904 can access via a browser as described herein.

The various locations 900-1, 900-2, 900-3 can include the on-premises connector 400 (app connector) for connectivity to the cloud-based system 100. Also, the on-premises connector 400 can be a docker (software container). The docker can be integrated with an edge device at the locations 900-1, 900-2, 900-3. For example, the connector 400 can support AMD64 and ARM64 platforms as well as Intel platforms and others, with low memory and CPU footprint, as is used in edge devices for various OT, IOT, IIOT, ICS, etc. type devices 300.

The cloud-based system 100 includes the service edges 150 which are configured to create secure tunnels with the on-premises connector 400 and with the application 350, as well as support client-less operation through browser access. The service edges 150 are configured to perform policy and security on the connections as described herein.

This approach is faster and more secure for accessing the various OT, IOT, IIOT, ICS, etc. type devices 300 than conventional VPNs which are cumbersome, risky, and have complicated configuration (e.g., for firewalls). Also, using the virtual private access for the various OT, IOT, IIOT, ICS, etc. type devices 300 reduces the attack surface as there is never direct exposure to the Internet.

Browser Isolation with OT, IOT, IIOT, ICS, Etc. Type Devices

FIG. 24 is a network diagram illustrating use of browser isolation with OT, IOT, IIOT, ICS, etc. type devices 300. This approach prevents any physical access to the OT, IOT, IIOT, ICS, etc. type devices 300 and all that is passed to a third party 904 and the cloud-based system 100 is pixels, and keystrokes, mouse commands, etc. from the third party 904 to the cloud-based system 100, i.e., third-parties and vendors do not have to install anything and no bits cross into the OT system, only console-based control.

Privileged Remote Access for OT, IOT, IIOT, ICS, Etc. Type Devices

Remote access is a key technology that enables production monitoring and predictive maintenance in smart factories. By granting remote workers and third-party vendors the ability to connect to production/field assets and view machine data, they can monitor, troubleshoot, and repair equipment in real-time for maximum plant uptime and efficiency.

Remote users have historically connected to industrial assets through virtual private networks (VPNs), but VPNs are cumbersome to manage and have inherent security flaws. Legacy remote access approaches using VPNs can be easily circumvented by attackers taking advantage of the inherent trust and overly permissive access of traditional castle-and-moat architectures, including:

Traditional OT environments are at risk of disruption from expanded attack surfaces: Attackers can see and exploit vulnerable, externally exposed OT assets. Most OT systems are unpatchable, do not get patches from vendors as often as they should, and do not have sufficient downtime for constant patches. The present disclosure protects OT devices and does not require changes to them. An alternative that required special software in the OT device—even if that software was installed from the outset and not via a patch—would cause certification problems and would tax scarce resources.

Legacy architecture do not scale or deliver fast, seamless user experiences: VPNs require backhauling, which introduces cost, complexity, and too much latency for today's remote workforce. VPNs also have high operational overhead since they typically require inbound ports which means constant firewall changes to limit user access.

Lack of least-privileged access allows free lateral movement: VPNs put users on your network, giving attackers easy access to critical OT assets. VPNs bring the user's unmanaged endpoints directly to the OT network, increasing the risk of ransomware and malware into the production floor.

These cyberthreats can ultimately cause downtime and potentially pose a physical safety risk to plant workers and equipment. With VPN security flaws and ransomware attacks directly affecting revenue, OT operators are looking to zero trust security as a safe and reliable alternative to VPNs.

Privileged Remote Access (PRA) is a cloud-delivered zero trust access solution that enables fast, secure, and reliable connectivity to OT and IIOT devices from field locations, the factory floor—or anywhere. Privileged Remote Access enabled by the cloud-based system 100 and the virtual private access, provides remote workers and third-party vendors with clientless remote desktop access to sensitive Remote Desktop Protocol (RDP) and Secure Shell (SSH) production systems, along with Virtual Network Computing (VNC) and others, without having to install a client on unmanaged devices or log into jump hosts and VPNs.

Privileged remote access boosts uptime and productivity, direct connectivity makes it fast for users to connect to and repair equipment, minimizing downtime and eliminating slow, costly backhauling over legacy VPNs. Privileged remote access increases plant and people safety-OT networks and systems are hidden from the Internet through inside-out connections, so assets cannot be discovered or exploited by bad actors seeking to disrupt production processes. Privileged remote access delivers an exceptional user experience-Clientless access from users' web browsers tiple disjointed remote access tools, unifying security and access policies to stop breaches and reduce operational complexity.

FIG. 25 is a network diagram of the cloud-based system 100 for describing the flow of privileged remote access for OT, IOT, IIOT, ICS, etc. type devices. The following describes an example operation of virtual private access as described herein with the OT, IOT, IIOT, ICS, etc. type devices.

At a step 950-1, a user 102, from any HTML5-capable web browser like Chrome, Safari or Microsoft Edge for client-less access or via the application 350, goes to a privileged remote access portal, such as hosted by the cloud-based system 100.

At a step 950-2, the user 102 logs in with their credentials and is authenticated to a SAML Identity Provider 122. The privileged remote access portal displays only the consoles that the user 102 is authorized to access.

At a step 950-3, the user 102 requests a fully isolated RDP or SSH session. The privileged remote access portal forwards the user's traffic to the closest service edge 150, which acts as a broker, where the user's security and access policies are checked and enforced.

At a step 950-4, the service edge 150 determines the application 402, 204 in closest proximity to the user 102 and establishes a secure connection to the app connector 400, a lightweight virtual machine or Docker container installed in the OT environment that hosts your RDP or SSH OT targets/servers.

At a step 950-5, the RDP or SSH sessions are terminated at app connector 400 and converted to HTML5 streams which are made available to the service edge 150 to stitch back to the user's session.

At a step 950-6, finally, once a connection is brokered between the user's device 300 and the OT targets, the user interacts with the fully isolated remote session via keyboard and mouse, or trackpad.

| | |
|---|---|
| Clientless access over HTML5-capable browsers | Connect internal and external users to RDP and SSH target systems with full isolation, allowing users to connect from unmanaged endpoints and untrusted networks. Enable third-party users to access data securely while blocking data from being copied, pasted, uploaded from or down- loaded to their local unmanaged device. |
| Fully isolated, clientless RDP and SSH sessions | Allow third-party users to access OT systems from any HTML5-capable browser without the need to install a client or connect through VPN on unmanaged devices. |
| No network changes | Allow access to systems across multiple sites-even with overlapping IP addresses-without the need for manual and expensive network address translation. Constant firewall changes are also avoided since there is only one outbound connection from the plant floor. |
| Zero attack surface | OT systems are hidden from the internet and unauthorized users by creating a secure segment of one between an authorized user to a specific device. Remove all inbound connectivity to the OT network. |
| User identity based OT access | Continuously validate access policies based on user, device, content, and application risk posture with a powerful native policy engine to ensure only valid, authenticated users can access production systems. | makes it easy for remote workers and third-party vendors and contractors to access OT systems without the friction of conventional VPN. Privileged remote access through the cloud-based system 100 is a unified platform for secure access across apps, workloads, and OT devices. Privileged remote access extends zero trust across private apps, workloads, and OT/IIOT devices to simplify and integrate mul- Request Flow FIG. 26 is a network diagram of an example request flow for privileged remote access for OT, IOT, IIOT, ICS, etc. type devices. This includes a protocol translator, such as Guacamole, but note the implementation may not need a protocol translator. On one side of the translator is a generic protocol, which has a generic way of representing key strokes, mouse movements, and display operations like painting a rectangle. On the other side are specialized protocols—RDP, SSH, VNC. In an embodiment, the generic protocol is the guacamole protocol, and the protocol translator is guacd.

At step 1, the user device 300 connects WebSocket over TLS. Each Remote Console 1000 has a different URL, so the cloud-based system 100 knows exactly which Remote Console 1000 the Browser is trying to connect to. Authentication of the user and enforcement of access policies and other policies work as in Browser Access today.

The cloud-based system 100 can include an Exporter that performs the handshake phase of the Guacamole protocol with the Browser. During the handshake, the Exporter provides a Guacamole connect instruction that specifies the hostname/IP address and port of the remote console; these are obtained from the privileged remote access configuration. The handshake phase ends when the Exporter sends a ready instruction to the Browser. From that point on, the Exporter proxies Guacamole instructions between the Browser and guacd. It is also possible to modify guacd itself to perform the handshake phase, but we prefer to minimize proprietary changes to open-source code.

Steps 2 and 3 are an mtunnel. The content is the Guacamole protocol. Something must tell the connector 400 to process this mtunnel specially. One approach includes a guac field to for a broker request message. The field informs the connector 400 that it is to be a Guacamole mtunnel. It is also possible to add a guac field to the ACK message as well, so the connector 400 can agree that it is a Guacamole tunnel.

In the Guacamole handshake, the client may specify what image formats it supports, like this: 5.image, 9.image/png, 10.image/jpeg;

guacd on the connector 400 needs this information. After validating these instructions, the Exporter sends them through the mtunnel. Step 4 is a localhost TCP connection. The content is the Guacamole protocol. guacd creates a child guacd for each Guacamole connection.

Finally, step 5 is an SSH, RDP, or the like connection to the console 1000.

Policy Based Authentication for PRA Sessions

PRA systems can include systems such as Windows, Unix, Mac machines, etc. Various methods can automatically select the most optimal authentication method and materials through zero trust policies. These zero trust policies can be preconfigured for specific users, groups of users, tenants, etc. to provide end users with tailored authorization, while protecting credentials as a category of protected resources in private access systems such as ZPA.

Again, the main problem with traditional approaches is that user credentials and methods of authentication are at risk due to the use of third party authentication services. This disclosure provides methods for protecting such methods, credentials, and other secret materials used to authenticate into PRA systems. These proposed methods are performed in full compliance with zero trust methodology and practice as described herein. These protected credentials are matched with the PRA request, and subsequent authentication attempts, through zero trust policy configured with an arbitrary number of criterium expressions.

Expressions can be utilized for pinpointing the identity of the request issuer (user) to a stored and protected credential. The credential can be used to seamlessly provide authentication into the PRA system without the end user being required to do anything. The protected credentials can be protected by ZPA or other private access systems. This mechanism can then be used to fine tune what a given identity can do, or not do, on the PRA system once authenticated.

Various embodiments use a plurality of criteria in order to identify which credentials to use for the seamless authentication into specific PRA systems. These criteria can include Security Assertion Markup Language (SAML) attributes, client posture, end user network, etc. In an example, a user utilizing a trusted network can be assigned a credential that gives them more accessibility than a user using an untrusted network in the specific PRA system. With this said, users coming from an untrusted network can be given credentials that significantly limit what can be done on the specific PRA system. Additionally, such a session can be observed more closely by systems in the zero trust network (cloud-based system). Various policies that govern how the credentials are assigned can be managed by administrators associated with a tenant, user, group of users, etc.

FIG. 27 is a diagram of the cloud-based system 100 adapted to provide policy based authentication for PRA systems. The cloud-based system 100 is adapted to provide zero trust network access and perform the methods described herein. A user 102 can request to access any of a plurality of PRA systems 2702. These PRA systems 2702 can include any of the OT, IOT, IIOT, ICS, etc. type systems/devices described herein. This triggers the present methods for policy based authentication via the cloud-based system 100. The various criteria which are utilized to identify which credentials to use can be defined by the policy, which can be preconfigured by administrators. Thus, an administrator can be enabled to configure credentials via policy to enable the sign-on processes herein.

In various embodiments, an administrator is able to configure credentials that can be mapped and injected into a Remote Desktop Protocol (RDP), Secure Shell (SSH), and Virtual Network Computing (VNC) session without requiring the end user to enter any credentials.

Exporters can evaluate policies for credential mapping, these policies being applicable to privileged consoles. This is different than access policies as they are not applicable to an entire application segment. For example, an application segment can have a plurality of types of consoles (RDP, SSH, VNC, etc.) where each of them can have a separate credential map policy. In an embodiment, various criteria which are applicable to credential mapping and file transfer policies can be SAML and System for Cross-Domain Identity Management (SCIM) attributes.

In order to support the evaluation of policies, various embodiments can utilize different options. These options include refactoring policy engines on brokers and breaking them into libraries. Customer managers and policy evaluators can be used by both the associated exporter and the associated broker. In order to accommodate differences in access policies, credential mapping, and file transfer policies, a policy builder library can be updated. Another option can include adding new policy engines on exporters which are based on broker policy code. Other options can include extending the policy engine framework to support the new policy.

In various embodiments, when a user selects a console in a PRS portal, the browser is adapted to send a request for console information to the exporter. The console information includes the name and type of console selected. When the exporter receives the request, it calls to trigger the policy evaluation code. The response structure can be modified to let a Use Interface (UI) know if interactive authorization dialogue needs to be triggered. The exporter can further check if there are any credential rules that apply to the selected console. If so, the rules are evaluated in order by the policy framework. In an embodiment, the first applicable console credential rule will be utilized. The credential (i.e., username/password, SSH key, password credential, etc.) mapped to the rule is retrieved and decryption of the credential can be done using a crypto service. If there is no credential mapped for the user and/or console, an interactive credential retrieval window is opened, where the user is instructed to input credentials. This can be achieved by sending an additional parameter to the browser.

FIG. 28 is a flow diagram for a new credential mapping workflow. The flow diagram shows steps for credential mapping (steps 1-17) where the steps start by a browser 2802 sending a Privileged Remote Access (PRA) portal request to an exporter 2804. An authentication step takes place by allowing a user to provide credentials such as a password and username. Credential policy is evaluated, and a tunnel request is sent to the exporter 2804. A tunnel is set up between the exporter 2804 and the application connector 2808. The exporter retrieves credentials, decodes the credentials, and forms connect instructions with the credentials. The decoding can include decryption using one or more crypto services. Connect instructions are then sent to the application connector 2808, and the SSH or RDP session is set up. Traffic associated with the session, between the exporter 2804 and the application server 2810, is then handled by private access systems (i.e., ZPA).

It will be appreciated that the application server 2810 can be a server associated with any PRA system. Additionally, the steps shown in FIG. 28 present an example, where any of the steps can be interchanged and/or removed for various embodiments.

Sensitive information such as passwords, private keys, etc. are not stored in plain text anywhere in the systems in order to avoid exposure which can result in malicious activities. Various embodiments store passwords and private keys in encrypted form in database tables. When the information is needed, it is decrypted and stored in memory for a finite amount of time, such as 1 second. In various embodiments, to cater encryption and decryption needs, one or more crypto services are used. On a management API side, passwords and private keys are encrypted using crypto store services and encrypted values are saved in database tables. In an example, when the information is needed, the information is decrypted and aged out of memory after 1 second.

Policy engines can be extended to add a new policy type for credential mapping. In these examples, no change to access policies are made, thus existing policy evaluation rules based on types (timeout, inspection, isolation, etc.) are not affected.

FIG. 29 is a screenshot of a User Interface (UI) for configuring privileged credentials. In various embodiments, the UI can be utilized to configure privileged credentials and privileged credential policy. The UI can show a list of credentials having fields including name, type, username, last update, and actions. The list can be filterable based on one or more of the fields.

FIG. 30 is a screenshot of a UI for adding privileged credentials. A user is able to add privileged credentials via the window shown in FIG. 10. The window displays input fields for name, description, type, username, password, and domain. The various types include username-password, SSH key, and password. When selected, the username-password type displays a username and password input field (for RDP connection). Selecting the SSH type displays the username input field and private key text area field (for SSH connection). Finally, when selected, the password type will display only a password input field (for VNC connections). Once the privileged credential is created, the user (administrator) cannot view the password and private key fields. However, the user can edit the credential, and update the password or private key.

FIG. 31 is a screenshot of a window for configuring privileged credential policy. The window can show a list of all privileged credentials mapped to privileged consoles along with the rules associated with the configured policy. This includes displaying a rule order. The list of privileged credentials can include fields of rule order, name, consoles, credentials, and actions. again, this list can be filterable based on the various fields and also based on SAML attribute names.

FIG. 32 is a screenshot of a window for adding a new rule. When a user selects to add a rule, the UI can present a modal window with inputs for various fields. These fields can include name, description, connection type (RDP, SSH, VNC, etc.), a multi-selectable dropdown listing all of the privileged consoles, and a criteria selector. In various embodiments, privileged consoles and credentials can be filtered and displayed based on the connection type selected. Various changes made through the UI can be tracked and reviewed through diagnostic logs. FIG. 33 is a screenshot of a window displaying diagnostic logs. The diagnostic logs can show credential usernames, credential policy IDs, error strings (i.e., privileged remote access error strings), etc. The error strings can be based on status codes received from various remote rendering protocols on application connectors. For example, error strings can be based on status codes received from Guacd (Guacamole protocol) on an application connector.

In various embodiments, APIs expect credential payloads to be sent in an unencrypted form. Encrypted credentials can be fetched and stored in a database. These encrypted credentials are not sent in any API response. Alternatively, an exporter will fetch the encrypted credentials from the database and use a crypto service to decrypt the credentials for credential mapping. APIs are adapted to get all console credentials from a provided customer ID and provide the results of stored credentials, retrieve stored credential objects by ID, delete the stored credentials by ID, create new credential objects, and update existing credential objects by ID.

Again, credential policy can be introduced as a new policy type. Various credential rules can map credentials and connection type with the appropriate credential policy. APIs can further be configured to perform operations on credentials including retrieving all credential rules for a provided customer ID, deleting credential rules by ID, creating new credential rule objects, and updating existing credential rule objects by ID.

Process for Policy Based Authentication for PRA Systems

FIG. 34 is a flowchart of a process 3400 for policy based authentication for PRA systems. The process 3400 includes steps of receiving a request to access a Privileged Remote Access (PRA) system (step 3402); determining if any credential rules apply to a console associated with the request (step 3404); retrieving credentials associated with any of a user and the console from a database, thereby avoiding the user being required to provide credentials (step 3406); and providing access to the requested PRA system based on the retrieved credentials (step 3408).

The process 3400 can further include wherein the credentials are retrieved based on matching credentials with the request, wherein preconfigured policy is utilized for matching an identity of the user issuing the request to a stored credential. The database can include credentials stored in an encrypted form, wherein the steps can further include decrypting the credentials after the retrieving. The decrypting can be performed through one or more crypto services. Decrypted credentials are stored in memory for a finite amount of time. Credentials can be retrieved based on a plurality of criteria including any of Security Assertion Markup Language (SAML) attributes, client posture, and end user network. Responsive to no credentials being found, the steps can further include providing an interactive credential retrieving window; and instructing the user to provide credentials via the interactive credential retrieving window.

Pause and Resume Functionality for Shared PRA Sessions

In various embodiments, multiple users are able to join the same PRA session for completing any of the above referenced activities. Establishing a zero trust architecture requires visibility and control over the environment, users, and traffic. A PRA session is an entity which must be controlled and monitored, and this requirement is amplified when multiple users join a PRA session. The present systems and methods provide a tool to allow administrators to monitor live PRA sessions and have live control over pause and resume functionality.

In various embodiments of PRA functionality disclosed herein, protocols such as Guacamole are used to establish the browser based remote session to the server. These sessions can be shared across a plurality of users. In an exemplary use case, consider an administrator joining a PRA session along with a plurality of users such as engineers/operators. The users may send instructions/commands to the server machine, or other infrastructure/device described herein. Monitoring the commands played by the active users on the session and prohibiting the users from doing unwanted damage to the server or the network system is important. Administrators can make use of a "terminate" feature to disconnect all the users and disconnect the session in case one of the users tries to perform unwanted actions. Although the terminate feature ends the session, thus blocking any unwanted actions, it is laborious because if the action was valid, it requires creation and sharing of a new session in order for the session to continue. The above described problem can be solved using a pause and resume feature, where administrators may want to pause the session and question the operator about his/her intentions. If satisfied, the administrator may resume/play the session.

Again, there are other features like terminating the session. However, the termination of the session is laborious because it will require creation and sharing of a new session. Thereafter all users must wait until all of the users rejoin the new session and resume the activity. Further, protocols such as Guacamole, and others of the like, do not support such a feature to allow administrators to pause and resume PRA sessions.

FIG. 35 is a flow diagram depicting an exemplary shared PRA session. In an embodiment, for PRA, an administrator 3502 can join a session along with one or more operators, such as the contractor 3504 and engineer 3506. The administrator can view entire screen updates and keystrokes played by the operator for monitoring operator activity. For the example shown in FIG. 35, the administrator 3502 can monitor a live session. The engineer 3506 can guide the contractor 3504 to execute various commands. The contractor 3504 can type keystroke commands in an SSH session or perform any mouse clicks in a Windows RDP/VNC session.

All activities are intercepted by the exporter 2804 to which the user is connected to, and the guacamole instructions are sent to guacd daemon for the processing. As described herein, guacd then relays such commands to the server associated with the application, infrastructure, etc.

In various embodiments, the exporters 2804 can control the flow of guacamole instructions to and from the guacd daemon. An additional UI interface can be provided specifically to administrators or based on a role of the user to pause or resume the session. That is, the UI can be provided to a specific user based on the specific user's security and access policies.

When the administrator selects the "pause" button on the UI (special control/button on the live session), it will invoke the command-handler on the exporter. An exporter where the user is connected using connection-id/session-id will call subsequent handlers to block relaying the guac-instructions from the user to guacd. Thereby, guacd will not receive the user commands/instructions. During this "block", i.e., while the users commands/instructions are paused, the administrator can question the operator about the intentions or ask for clarifications on the commands. If satisfied with the answer, the administrator may resume the session. In various embodiments, the UI also includes a "resume" button.

When the administrator clicks on the "resume" button on the UI (special control/button on the live session), it will invoke the command-handler on the exporter. The exporter where the user is connected using connection-id/session-id will call subsequent handlers to unblock the relaying of the guac-instructions from user to guacd for the specific session. That way guacd will receive the user commands and act on the instructions as it previously did before the pause.

The present pause and resume feature can be applicable to any kind of Guacamole deployments where role-based authentication, policy, and session joining is supported. FIG. 36 is a flow diagram of another exemplary shared PRA session. The example shown in FIG. 36 shows a deployment where the guacd daemon is running on the exporter 2804. The same mechanics help to pause and resume the PRA session as before.

By utilizing the present systems and methods, enterprises do not have to provide RDP connections to infrastructure and PRA sessions including a plurality of users can be monitored and controlled in order to mitigate unwanted activity. By providing the present pause and resume functionality to administrators and other specified users, there is no need to terminate a session, thereby removing the need to re-initiate a session for all users.

In various embodiments, the present systems and methods can further include the ability to provide various communication channels between the users of a shared PRA session, even while the PRA session is paused for one or more of the users. For example, provide administrators and other users audio and video capabilities for shared sessions. Further, the pause and resume functionality can be adapted to allow administrators to pause and resume the PRA session for specific users in the shared session, thereby only blocking commands from specific users, while other users are still able to interact with the server. Similarly, the pause and resume functionality can be adapted to allow administrators to pause and resume the PRA session for all users, except for the administrator. Additionally, the present systems and methods can include, while a user's commands are being blocked (i.e., while a user is paused), continuing to provide pixels to the paused user. For example, while a user is paused, the user can still view the session while their commands are being blocked.

Process for Pause and Resume Functionality in Shared PRA Sessions

FIG. 37 is a flow chart of a process 3700 for pause and resume functionality in shared PRA sessions. The process 3700 includes responsive to determining one or more users are allowed to access an application associated with infrastructure, determining the one or more users' security and access policies, and creating a Privileged Remote Access (PRA) session for the one or more users (step 3702); brokering a connection between one or more user devices associated with the one or more users and the application through a lightweight connector, and enabling the one or more users to send commands to the application (step 3704); receiving a pause command from one of the one or more users (step 3706); and responsive to receiving the pause command, blocking commands from the one or more users from reaching the application (step 3708).

The steps can further include receiving a resume command; and responsive to receiving the resume command, enabling the one or more users to send commands to the application. The steps can further include providing a User Interface (UI) to a specific user of the one or more users, wherein the UI provides the specific user with the ability to send pause and resume commands. The UI can be provided to the specific user based on the specific user's security and access policies. The pause command can include instructions to only pause the PRA session for one user of the one or more users, wherein the steps further include blocking commands from the one user from reaching the application. The lightweight connector can be one of a virtual machine and a docker container hosted in the infrastructure. The steps can further include providing a communication channel to allow communication between the one or more users while blocking commands. The steps can further include performing browser isolation to the one or more user devices such that only pixels are transmitted thereto and only keystrokes and mouse commands are transmitted to the application. The steps can further include responsive to receiving a pause command, blocking commands from the one or more user devices from reaching the application while continuing to transmit pixels to the one or more user devices. The same pixels can be transmitted to each of the one or more user devices during the PRA session.

Protecting Shared PRA Sessions Based on User Risk

As described herein, establishing a zero trust architecture requires visibility and control over an environment including its users and traffic. One feature which must be controlled and monitored is shared PRA sessions. These sessions can introduce risk, specifically when a plurality of users join a PRA session. When proctoring a session, the host (session creator) can invite a plurality of users to join the PRA session. However, as described herein, users can have risk scores assigned to them, identifying how risky a user's historical actions have been. Thus, the users invited to a shared PRA session may have high risk scores, and having such users connected to a shared PRA session can introduce risk to an enterprise's systems.

A user risk score/threat score in a cloud environment is a metric used to evaluate the potential security threat that a user may pose to the cloud infrastructure, applications, and data based on their activities, behavior, and access patterns. This score can be an integral part of the comprehensive cloud security strategy described herein, helping organizations to proactively identify, assess, and mitigate risks. The calculation of user risk scores is dynamic, continuously updating as new data about user behavior is collected. Thus, various systems, such as the present systems for protecting shared PRA sessions, can utilize user risk scores for facilitating their operation.

The present disclosure provides systems and methods for providing guidance and additional information to the host of a PRA session. In various embodiments, the additional information can include the risk score of users who are invited to participate in a PRA session. Further, the systems can automatically apply policies for invited users based on their risk score. That is, the present systems can enforce restrictions and perform actions on users with high risk scores, i.e., users with a risk score over a threshold value. These restrictions and actions can include denying a user from being invited to a PRA session, blocking a user from creating a PRA session, kicking a user out of a PRA session, and enforcing read-only access to a user in a PRA session. When enforcing read-only access policy, the systems can block a user's commands from reaching the application as described herein, thereby allowing a user with a high/moderate risk score to only view the session and not interact with the associated application/systems.

FIG. 38 is a diagram of a typical shared PRA session. In such a session, a host (administrator) 3502 can invite a plurality of users 3800 (participants) to join the session as shown. Note these users 3800 can include the contractor 3504 and engineer 3506 described herein. Consider a scenario where a host 3502 wants to invite a user 3800 to a shared PRA session whose risk score is high. In this context, a high risk score indicates that a user 3800 can have malicious/disruptive intentions and can cause harm to the network resources and enterprise systems. The solutions described herein aim to eliminate the risk associated with allowing high-risk users to join shared PRA sessions. Again, such risk can be eliminated by providing the host 3502 with a user's risk score, where the host can make a determination based thereon to invite the user 3800 or not. Further, as described, the systems can automatically apply policies for invited users based on their risk score, if a user with a high risk score is invited to and joins a shared PRA session. In various embodiments, the systems can also deny a host 3502 from inviting any users 3800 with a risk score above a threshold.

FIG. 39 is a diagram of an embodiment of the present systems and methods for protecting shared PRA sessions. As stated, the present systems and methods can utilize user risk scores for informing a host 3502 of potential threat actors and to perform various actions associated with shared PRA sessions. As described, the cloud-based system 100 includes various services that are adapted to generate user risk scores for users associated with customers/enterprises. In various embodiments, these user risk scores are stored in a user risk database 3900 for use by other systems such as the shared PRA session protection systems described herein.

In various embodiments, user risk thresholds can be divided into various categories including low-risk, medium-risk, and high-risk. For example, if user risk is quantified as a score between 0-100, the various risk categories can be portioned where low-risk includes scores between 0-30, medium-risk includes scores between 31-60, and high-risk includes scores between 61-100. That is, for example, if a user is assigned a risk score of 67, that user will be considered a high-risk user.

In various embodiments, a user in the low-risk category can be allowed to be invited to and join a shared PRA session. Alternatively, a user in the medium-risk category is considered a moderate risk, and the user can be invited and allowed to join a shared PRA session, but not allowed to gain mouse and keyboard access, i.e., the users commands will be blocked. Further, for a user in the high-risk category, the systems can block the user from being invited and/or kick the user out of a session if the user is already in a session.

Below are various use cases exhibiting example operation of the present systems and methods for protecting shared PRA sessions. In a first use case, a host 3502 decides to invite user-1 and user-2. The request to invite the users is sent to the exporter 2804 which is connected to the host 3502. The exporter 2804 performs a user risk check, wherein the user risk database 3900 is utilized for identifying the risk scores associated with user-1 and user-2. If the risk score of any of the invited users is above a threshold, the invitation associated with that user is rejected and the user is not invited to the session. Again, the threshold for rejecting an invitation can be related to the user being in the high-risk category.

In another use case, when a user joins a session, the host may allow the user to use keyboard and mouse inputs to control the application/system. However, if the user risk score of the user is within the medium-risk category, the systems can block the host from allowing such a user to use keyboard and mouse inputs to control the application/system, thereby enforcing read-only policy on the user. In various embodiments, the systems can continuously monitor risk scores of users within a session to enforce dynamic PRA session protection. That is, if a user's risk score is updated during a session, the systems can take appropriate action to protect the session. Consider a scenario where a user has joined a session with regular access. However, during the session, the users risk score is updated in the user risk database 3900. An asynchronous notification is sent to the exporter 2804 responsive to the updated score. Based on the new/updated risk score, the systems can automatically downgrade the users access to read-only and/or kick the user from the session. Additionally, the host 3502 can be notified of the user's risk score and provide a suggestion to kick the user from the session.

Process for Protecting Shared PRA Sessions Based on User Risk

FIG. 40 is a flow chart of a process 4000 for protecting shared PRA sessions based on user risk. The process 4000 includes receiving, at a Privileged Remote Access (PRA) system, one or more invitations from a host, the one or more invitations being for one or more users to join a PRA session (step 4002); responsive to receiving the one or more invitations, determining a risk score of each of the one or more users associated with the one or more invitations (step 4004); and rejecting or allowing each of the one or more invitations based on the risk score of each of the one or more users (step 4006).

The process 4000 can further include wherein the determining includes referencing a user risk database for determining a risk score of each of the one or more users associated with the one or more invitations. The rejecting or allowing can be based on the risk score of each of the one or more users being below or above a threshold. The steps can include (i) rejecting an invitation of the one or more invitations based on a user associated with the invitation being in a high-risk category based on their risk score, (ii) allowing an invitation of the one or more invitations based on a user associated with the invitation being in a low-risk category based on their risk score, and (iii) allowing an invitation of the one or more invitations with read-only access based on a user associated with the invitation being in a medium-risk category based on their risk score. The steps can further include responsive to allowing one or more invitations, creating a PRA session, and brokering a connection between one or more users associated with the one or more allowed invitations and an application through a lightweight connector, and enabling the one or more users to send commands to the application. The steps can further include enforcing read-only policy on any of the one or more users during the PRA session based on the risk score of each of the one or more users. The steps can further include continuously monitoring risk scores of the one or more users during the PRA session. The steps can further include responsive to detecting an updated risk score for a user of the one or more users, enforcing read-only policy on the user during the PRA session. The steps can further include responsive to detecting an updated risk score for a user of the one or more users, kicking the user from the PRA session. The steps can further include responsive to detecting an updated risk score for a user of the one or more users, notifying the host of the updated risk score.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A method comprising steps of:

receiving, at a Privileged Remote Access (PRA) system, one or more invitations from a host, the one or more invitations being for one or more users to join a PRA session;

responsive to receiving the one or more invitations, determining a risk score of each of the one or more users associated with the one or more invitations; and rejecting or allowing each of the one or more invitations based on the risk score of each of the one or more users, wherein, responsive to allowing an invitation of the one or more invitations, the PRA system creates the PRA session and brokers, via a service edge acting as a broker, a connection between a user device of the allowed user and an application through a lightweight connector that establishes an inside-out outbound connection to the service edge without accepting inbound connections, wherein the PRA system enforces, for the PRA session, a security and access policy that includes selectively blocking commands from the user device from reaching the application to provide read-only access based on the risk score;

responsive to allowing one or more invitations, creating a PRA session, and brokering a connection between one or more users associated with the one or more allowed invitations and an application through a lightweight connector, and enabling the one or more users to send commands to the application;

continuously monitoring risk scores of the one or more users during the PRA session, including receiving, at an exporter associated with the PRA system, an asynchronous notification responsive to an updated risk score stored in a user risk database, and automatically updating a security and access policy applied to the PRA session based on the updated risk score; and responsive to detecting an updated risk score for a user of the one or more users, enforcing read-only policy on the user during the PRA session, wherein enforcing the read-only policy comprises, at an exporter handling the PRA session, blocking relaying of session instructions from the user device to a protocol daemon associated with the lightweight connector such that the protocol daemon does not receive the user's commands, while continuing to transmit pixels associated with the PRA session to the user device.

2. The method of claim 1, wherein the determining includes referencing the user risk database for determining a risk score of each of the one or more users associated with the one or more invitations.

3. The method of claim 1, wherein the rejecting or allowing is based on the risk score of each of the one or more users being below or above a threshold.

4. The method of claim 1, wherein the steps comprise:

(i) rejecting an invitation of the one or more invitations based on a user associated with the invitation being in a high-risk category based on their risk score, (ii) allowing an invitation of the one or more invitations based on a user associated with the invitation being in a low-risk category based on their risk score, and (iii) allowing an invitation of the one or more invitations with read-only access based on a user associated with the invitation being in a medium-risk category based on their risk score.

5. The method of claim 1, wherein the steps further comprise:

enforcing read-only policy on any of the one or more users during the PRA session based on the risk score of each of the one or more users.

6. The method of claim 1, wherein the steps further comprise:

responsive to detecting an updated risk score for a user of the one or more users, kicking the user from the PRA session.

7. The method of claim 1, wherein the steps further comprise:

responsive to detecting an updated risk score for a user of the one or more users, notifying the host of the updated risk score.

8. A non-transitory computer-readable medium comprising instructions, wherein the instructions are executable by a cloud-based system to perform steps of:

receiving, at a Privileged Remote Access (PRA) system, one or more invitations from a host, the one or more invitations being for one or more users to join a PRA session;

responsive to receiving the one or more invitations, determining a risk score of each of the one or more users associated with the one or more invitations; and rejecting or allowing each of the one or more invitations based on the risk score of each of the one or more users, wherein, responsive to allowing an invitation of the one or more invitations, the PRA system creates the PRA session and brokers, via a service edge acting as a broker, a connection between a user device of the allowed user and an application through a lightweight connector that establishes an inside-out outbound connection to the service edge without accepting inbound connections, wherein the PRA system enforces, for the PRA session, a security and access policy that includes selectively blocking commands from the user device from reaching the application to provide read-only access based on the risk score;

responsive to allowing one or more invitations, creating a PRA session, and brokering a connection between one or more users associated with the one or more allowed invitations and an application through a lightweight connector, and enabling the one or more users to send commands to the application;

continuously monitoring risk scores of the one or more users during the PRA session, including receiving, at an exporter associated with the PRA system, an asynchronous notification responsive to an updated risk score stored in a user risk database, and automatically updating a security and access policy applied to the PRA session based on the updated risk score; and responsive to detecting an updated risk score for a user of the one or more users, enforcing read-only policy on the user during the PRA session, wherein enforcing the read-only policy comprises, at an exporter handling the PRA session, blocking relaying of session instructions from the user device to a protocol daemon associated with the lightweight connector such that the protocol daemon does not receive the user's commands, while continuing to transmit pixels associated with the PRA session to the user device.

9. The non-transitory computer-readable medium of claim 8, wherein the determining includes referencing the user risk database for determining a risk score of each of the one or more users associated with the one or more invitations.

10. The non-transitory computer-readable medium of claim 8, wherein the rejecting or allowing is based on the risk score of each of the one or more users being below or above a threshold.

11. The non-transitory computer-readable medium of claim 8, wherein the steps comprise:

(i) rejecting an invitation of the one or more invitations based on a user associated with the invitation being in a high-risk category based on their risk score, (ii) allowing an invitation of the one or more invitations based on a user associated with the invitation being in a low-risk category based on their risk score, and (iii) allowing an invitation of the one or more invitations with read-only access based on a user associated with the invitation being in a medium-risk category based on their risk score.

12. The non-transitory computer-readable medium of claim 8, wherein the steps further comprise:

enforcing read-only policy on any of the one or more users during the PRA session based on the risk score of each of the one or more users.

13. The non-transitory computer-readable medium of claim 8, wherein the steps further comprise:

responsive to detecting an updated risk score for a user of the one or more users, kicking the user from the PRA session.

14. The non-transitory computer-readable medium of claim 8, wherein the steps further comprise:

responsive to detecting an updated risk score for a user of the one or more users, notifying the host of the updated risk score.

\* \* \* \* \*